US010955659B2

(12) United States Patent
Brennan et al.

(10) Patent No.: US 10,955,659 B2
(45) Date of Patent: Mar. 23, 2021

(54) SCANNING DISPLAY WITH INCREASED UNIFORMITY

(71) Applicant: Facebook Technologies, LLC, Menlo Park, CA (US)

(72) Inventors: Vincent Brennan, Cork (IE); James Small, Langbank (GB); William Anthony Wall, Cork (IE); Stephen Warren Gorton, Redmond, WA (US); Wanli Chi, Sammamish, WA (US); Nicholas Daniel Trail, Bothell, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 220 days.

(21) Appl. No.: 16/058,752

(22) Filed: Aug. 8, 2018

(65) Prior Publication Data
US 2020/0049979 A1 Feb. 13, 2020

(51) Int. Cl.
G02F 1/163 (2006.01)
G02F 1/133 (2006.01)
(Continued)

(52) U.S. Cl.
CPC ......... G02B 26/105 (2013.01); G02B 6/0016 (2013.01); G02B 6/0031 (2013.01); G02B 27/0172 (2013.01); G02B 2027/0178 (2013.01)

(58) Field of Classification Search
CPC ............ G02B 26/0841; G02B 26/0833; G02B 6/3512; G02B 6/3556; G02B 6/356; G02B 26/105; G02B 6/357; G02B 6/3584; G02B 26/06; G02B 6/3518; G02B 6/3588; G02B 26/0816; G02B 26/085; G02B 26/12; G02B 7/1821; G02B 17/004; G02B 26/001; G02B 26/0825; G02B 26/0858; G02B 26/10; G02B 27/141; G02B 5/12; G02B 5/122; G02B 6/29311; G02B 6/29313; G02B 6/3546; G02B 6/3586; G02B 7/008; G02B 13/0005; G02B 13/0095; G02B 17/002; G02B 17/023; G02B 17/0856; G02B 21/0048; G02B 23/00; G02B 26/00; G02B 26/004; G02B 26/005; G02B 26/008;
(Continued)

(56) References Cited
U.S. PATENT DOCUMENTS
9,335,548 B1 5/2016 Cakmakci et al.
2002/0140918 A1 10/2002 Nakamura
(Continued)

OTHER PUBLICATIONS
PCT/US2018/046015, "International Search Report and Written Opinion", dated May 8, 2019, 13 pages.

Primary Examiner — Collin X Beatty
Assistant Examiner — Grant A Gagnon
(74) Attorney, Agent, or Firm — Weaver Austin Villeneuve & Sampson LLP

(57) ABSTRACT
A light assembly can have an array of light sources forming rows and columns, where the array comprises a plurality of chips, and each chip comprises a subarray of light sources forming the rows and columns. A boundary between chips in the array can be configured to extend diagonally across rows and columns of the array such that, for each column across which the boundary extends, the first row of the plurality rows may not have a light source disposed in the respective column, but a second row of the plurality of rows has a light source disposed in the respective column.

20 Claims, 15 Drawing Sheets

(51) Int. Cl.
*G02B 26/10* (2006.01)
*G02B 27/01* (2006.01)
*F21V 8/00* (2006.01)

(58) Field of Classification Search
CPC .... G02B 26/02; G02B 26/08; G02B 26/0866;
G02B 26/101; G02B 26/123; G02B
26/125; G02B 26/127; G02B 27/1006;
G02B 27/104; G02B 27/145; G02B
27/149; G02B 27/28; G02B 27/283;
G02B 27/30; G02B 27/48; G02B 3/14;
G02B 5/04; G02B 5/09; G02B 5/10;
G02B 5/124; G02B 5/1828; G02B 5/188;
G02B 5/1895; G02B 5/3083; G02B
6/024; G02B 6/12007; G02B 6/26; G02B
6/274; G02B 6/32; G02B 6/352; G02B
6/3542; G02B 6/3548; G02B 6/3582;
G02B 6/359; G02B 6/3592; G02B
6/3652; G02B 6/3676; G02B 7/183
USPC .......................................................... 359/223
See application file for complete search history.

(56) References Cited

U.S. PATENT DOCUMENTS

| | | |
|---|---|---|
| 2003/0011672 A1 | 1/2003 | Emge et al. |
| 2013/0016413 A1 | 1/2013 | Saeedi et al. |
| 2017/0235143 A1 | 8/2017 | Chi et al. |

SCANNING DISPLAY WITH INCREASED UNIFORMITY

BACKGROUND

The disclosure relates generally to near-eye-display systems, and more specifically to waveguide displays with a small form factor, a large field of view, and/or a large eye box. Near-eye, light-field displays project images directly into a user's eye, encompassing both near-eye displays and electronic viewfinders. Conventional near-eye displays generally have a display element that generates image light that passes through one or more lenses before reaching a user's eyes. Additionally, near-eye displays in virtual-reality (VR) systems and/or augmented-reality (AR) systems have design criteria to be compact, be light weight, and provide two-dimensional expansion with a large eye box and a wide field-of-view (FOV).

SUMMARY

This disclosure relates to an augmented-reality (AR) display; more specifically, and without limitation, to scanning architectures and methods for AR displays with increased illumination uniformity. In particular, a scanning architecture can comprise a light assembly with A light assembly can have an array of light sources forming rows and columns, where the array comprises a plurality of chips, and each chip comprises a subarray of light sources forming the rows and columns. A boundary between chips in the array can be configured to extend diagonally across rows and columns of the array such that, for each column across which the boundary extends, the first row of the plurality rows may not have a light source disposed in the respective column, but a second row of the plurality of rows has a light source disposed in the respective column.

An example system, according to the disclosure, comprises a light assembly comprising a plurality of chips and an array of light sources disposed on the plurality of chips and forming rows and columns. A boundary between a first chip and a second chip of the plurality of chips extends diagonally across a plurality of the rows of the array and a plurality of the columns of the array such that, for each column of the plurality of the columns of the array, a first row of the plurality of the rows does not have a light source disposed in the respective column, and a second row of the plurality of the rows has a light source disposed in the respective column. The system further comprises a mirror configured to rotate about an axis to reflect light emitted by the array of light sources toward an output, and controller circuitry configured to coordinate rotation of the mirror and emission of light from the array of light sources to create an output light pattern at the output during a scanning period.

An example method, according to the disclosure, comprises illuminating a mirror with a light assembly comprising a plurality of chips and an array of light sources disposed on the plurality of chips and forming rows and columns, where a boundary between a first chip and a second chip of the plurality of chips extends diagonally across a plurality of the rows of the array and a plurality of the columns of the array such that, for each column of the plurality of the columns of the array, a first row of the plurality of the rows does not have a light source disposed in the respective column, and a second row of the plurality of the rows has a light source disposed in the respective column. Moreover, the mirror is configured to rotate about an axis to reflect light emitted by the array of light sources toward an output. The method further comprises controlling rotation of the mirror and emission of light from the array of light sources to create an output light pattern at the output during a scanning period.

An example light assembly, according to the description, comprises an array of light sources forming rows and columns. The array comprises a plurality of chips, each chip of the plurality of chips comprising a subarray of the light sources forming the rows and the columns, and a boundary between a first chip and a second chip of the plurality of chips extends diagonally across a plurality of the rows of the array and a plurality of the columns of the array such that, for each column of the plurality of the columns of the array, a first row of the plurality of the rows does not have a light source disposed in the respective column, and a second row of the plurality of the rows has a light source disposed in the respective column.

BRIEF DESCRIPTION OF THE DRAWINGS

Illustrative embodiments are described with reference to the following figures.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The term "A is substantially equal to B" indicates that A is equal to B within an expected tolerance (e.g., a difference between A and B is not more than ten percent of B).

This disclosure relates generally to augmented-reality (AR) displays. More specifically, and without limitation, this disclosure relates to optical sources for AR displays. A light assembly comprises multiple rows of light sources per color. The rows are offset from each other for increased resolution.

Figure 1:
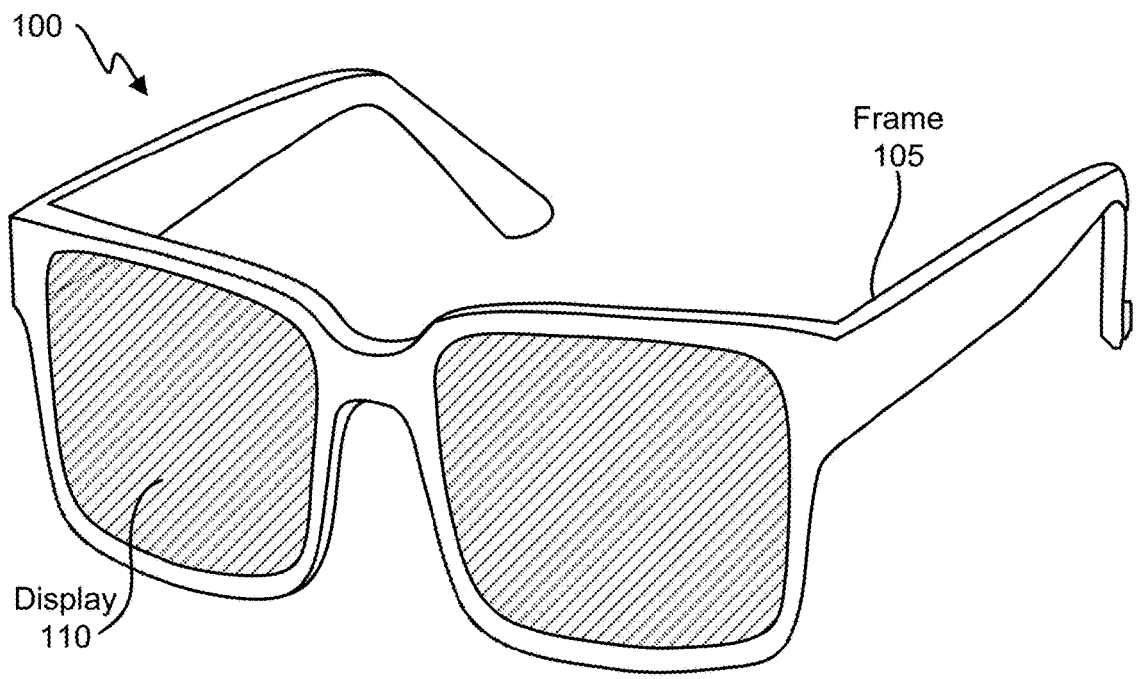
FIG. 1 is a diagram of an embodiment of a near-eye display.

FIG. 1 is a diagram of an embodiment of a near-eye display 100. The near-eye display 100 presents media to a user. Examples of media presented by the near-eye display 100 include one or more images, video, and/or audio. In some embodiments, audio may be presented via an external device (e.g., speakers and/or headphones) that receives audio information from the near-eye display 100, a console, or both, and presents audio data based on the audio information. The near-eye display 100 is generally configured to operate as a virtual reality (VR) display. In some embodiments, the near-eye display 100 may be modified to operate as an augmented reality (AR) display and/or a mixed reality (MR) display.

The near-eye display 100 includes a frame 105 and a display component 110. The frame 105 is coupled to one or more optical elements. The display component 110 is configured for the user to see content presented by the near-eye display 100. In some embodiments, the display component 110 comprises a waveguide display assembly for directing light from one or more images to an eye of the user.

Figure 2:
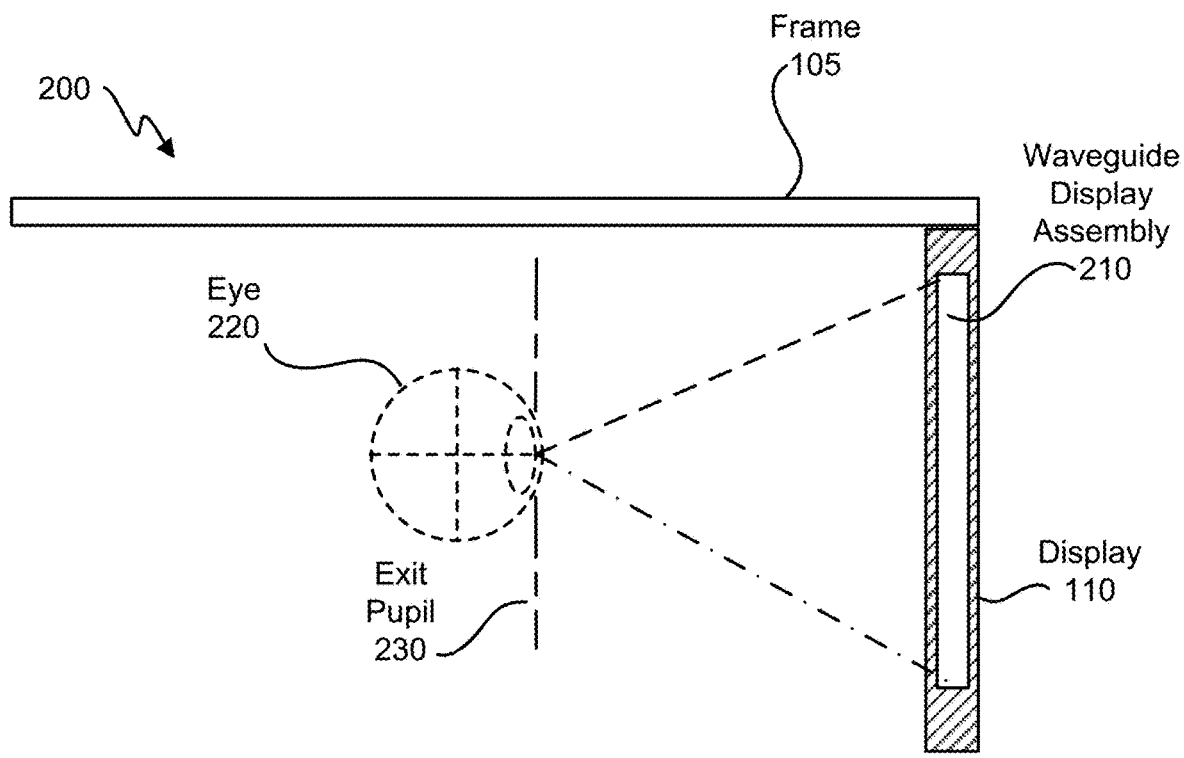
FIG. 2 is an illustration of a cross section of a near-eye display, according to an embodiment.

FIG. 2 is an illustration of a cross section 200 of the near-eye display 100 illustrated in FIG. 1, according to an embodiment. The display component 110 includes at least one waveguide display assembly 210. An exit pupil 230 is a location where the eye 220 may be positioned in an eye box region of the display component 110 when the user wears the near-eye display 100. For purposes of illustration, FIG. 2 shows the cross section 200 associated with a single eye 220 and a single waveguide display assembly 210, but a second waveguide display component may be used for a second eye of a user.

The waveguide display assembly 210 is configured to direct image light to an eye box located at the exit pupil 230 and to the eye 220. The waveguide display assembly 210 may be composed of one or more materials (e.g., plastic, glass, etc.) with one or more refractive indices. In some embodiments, the near-eye display 100 includes one or more optical elements between the waveguide display assembly 210 and the eye 220.

In some embodiments, the waveguide display assembly 210 includes a stack of one or more waveguide displays including, but not restricted to, a stacked waveguide display, a varifocal waveguide display, etc. in some embodiments, the stacked waveguide display may be a polychromatic display (e.g., a red-green-blue (RGB) display) created by stacking waveguide displays whose respective monochromatic sources are of different colors. In some embodiments, the stacked waveguide display may be a polychromatic display that can be projected on multiple planes (e.g. multi-planar colored display). In some configurations, the stacked waveguide display may be a monochromatic display that can be projected on multiple planes (e.g. multi-planar monochromatic display). As noted above, embodiments may comprise a varifocal waveguide display that can adjust a focal position of image light emitted from the waveguide display. In alternate embodiments, the waveguide display assembly 210 may include the stacked waveguide display and the varifocal waveguide display.

Figure 3:
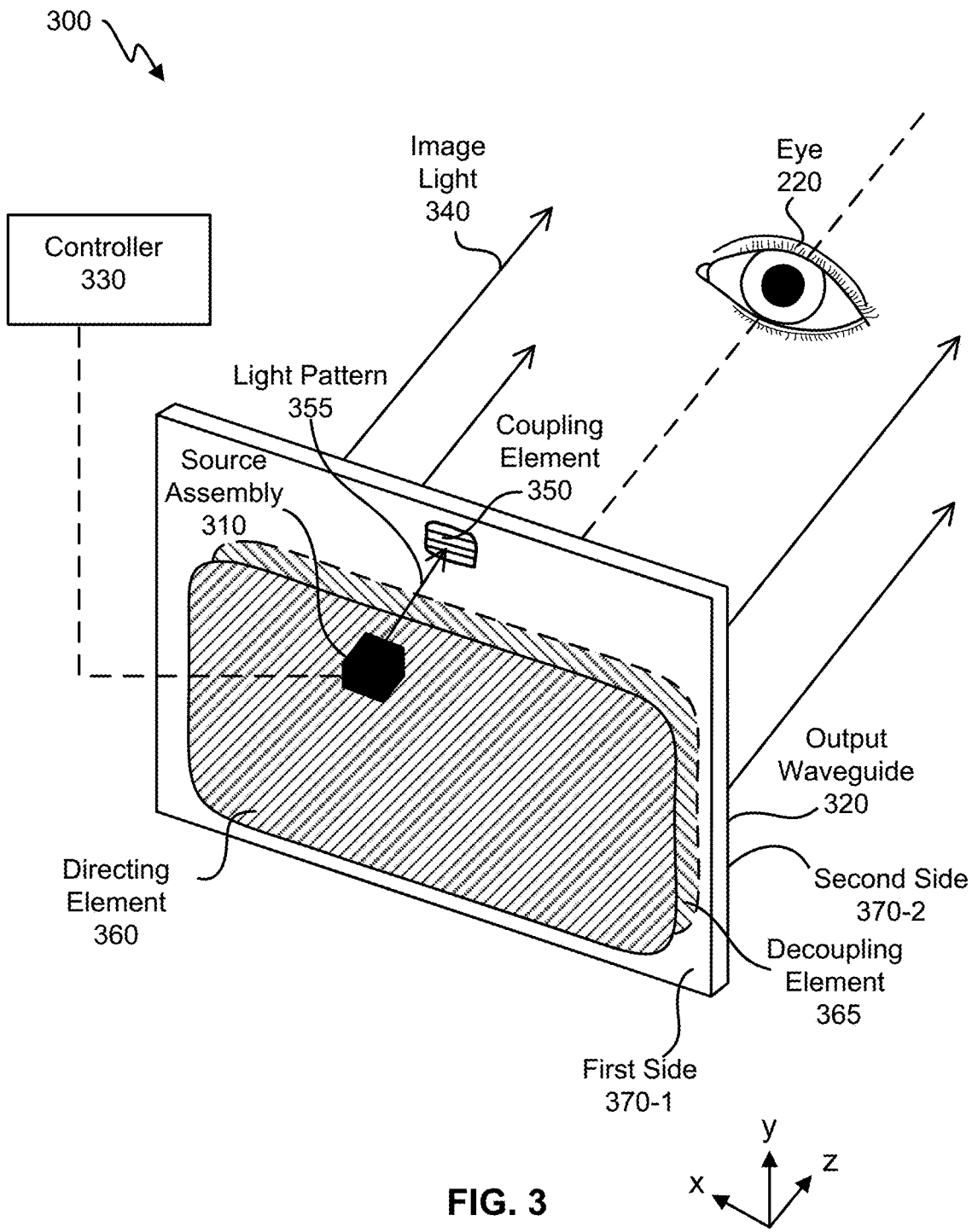
FIG. 3 is an isometric view of an embodiment of a waveguide display.

FIG. 3 is an isometric view of an embodiment of a waveguide display 300. In some embodiments, the waveguide display 300 may be a component (e.g., the waveguide display assembly 210) of the near-eye display 100. In some embodiments, the waveguide display 300 is part of some other near-eye display or other system that directs image light to a particular location.

The waveguide display 300 includes a source assembly 310, an output waveguide 320, and a controller 330. For purposes of illustration, FIG. 3 shows the waveguide display 300 associated with a single eye 220, but in some embodiments, another waveguide displays separate, or partially separate, from the waveguide display 300 provides image light to another eye of the user.

The source assembly 310 generates light pattern 355. The source assembly 310 generates and outputs the light pattern 355 to a coupling element 350 located on a first side 370-1 of the output waveguide 320. The output waveguide 320 comprises an optical waveguide that outputs expanded image light 340 to an eye 220 of a user. The output waveguide 320 receives the light pattern 355 at one or more coupling elements 350 located on the first side 370-1 and guides received light pattern 355 to a directing element 360. In some embodiments, the coupling element 350 couples the light pattern 355 from the source assembly 310 into the output waveguide 320. The coupling element 350 may be, e.g., a diffraction grating, a holographic grating, one or more cascaded reflectors, one or more prismatic surface elements, and/or an array of holographic reflectors.

The directing element 360 redirects the received light pattern 355 to the decoupling element 365 such that the received light pattern 355 is decoupled out of the output waveguide 320 via the decoupling element 365. The directing element 360 may be part of, or affixed to, the first side 370-1 of the output waveguide 320. The decoupling element 365 may be part of, or affixed to, the second side 370-2 of the output waveguide 320, such that the directing element 360 is opposed to the decoupling element 365. The directing element 360 and/or the decoupling element 365 may be, e.g., a diffraction grating, a holographic grating, one or more cascaded reflectors, one or more prismatic surface elements, and/or an array of holographic reflectors.

The second side 370-2 represents a plane along an x-dimension and a y-dimension. The output waveguide 320 may be composed of one or more materials that facilitate total internal reflection of the light pattern 355. The output waveguide 320 may be composed of, e.g., silicon, plastic, glass, and/or polymers. The output waveguide 320 has a relatively small form factor. For example, the output waveguide 320 may be approximately 50 mm wide along x-dimension, 30 mm long along y-dimension and 0.5-1 mm thick along a z-dimension.

The controller 330 controls scanning operations of the source assembly 310. The controller 330 determines scanning instructions for the source assembly 310. In some embodiments, the output waveguide 320 outputs expanded image light 340 to the user's eye 220 with a large field of view (FOV). For example, the expanded image light 340 provided to the user's eye 220 with a diagonal FOV (in x and y) of 60 degrees or greater and/or 150 degrees or less. In some embodiments, output waveguide 320 may be configured to provide an eye box with a length of 20 mm or greater and/or equal to or less than 50 mm; and/or a width of 10 mm or greater and/or equal to or less than 50 mm.

Figure 4:
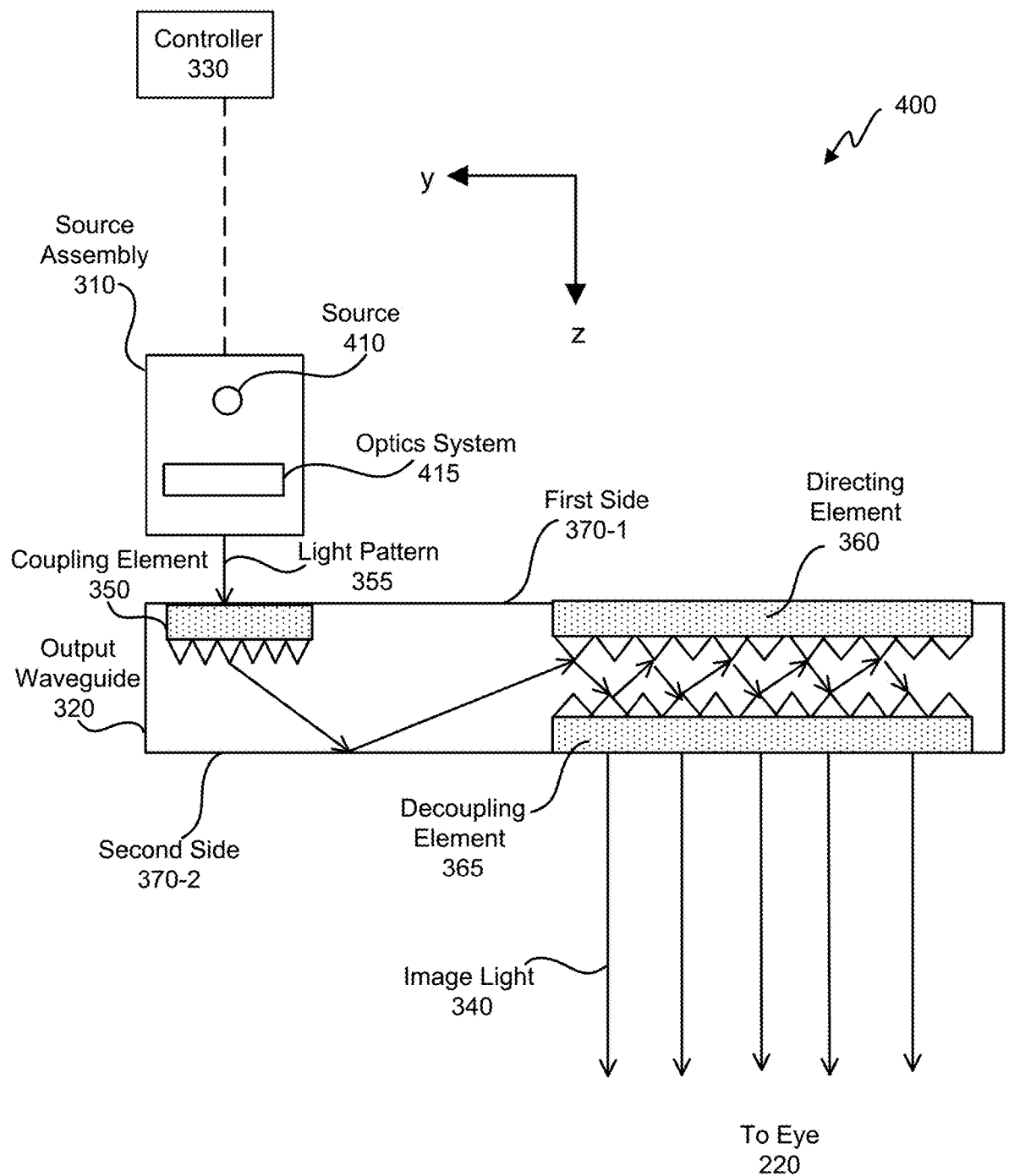
FIG. 4 is an illustration of a cross section of the waveguide display, according to an embodiment.

FIG. 4 is an illustration of a cross section 400 of the waveguide display 300, according to an embodiment. The cross section 400 can include the source assembly 310 and the output waveguide 320. The source assembly 310 can generate a light pattern 355 in accordance with scanning instructions from the controller 330. The source assembly 310 can include a source 410 and an optics system 415. The source 410 may comprise a light source (e.g., a light assembly, as described in further detail below) that generates coherent or partially coherent light. The source 410 may comprise one or more light sources, which may include, e.g., a laser diode, a vertical cavity surface emitting laser, a light emitting diode (LED), and/or the like.

The optics system 415 may include one or more optical components that condition the light from the source 410. Conditioning light from the source 410 may include, e.g., expanding, collimating, and/or adjusting orientation in accordance with instructions from the controller 330. The one or more optical components may include one or more lens, liquid lens, mirror, aperture, and/or grating. In some embodiments, the optics system 415 includes a liquid lens with a plurality of electrodes that allows scanning a beam of light with a threshold value of scanning angle to shift the beam of light to a region outside the liquid lens. Light emitted from the optics system 415 (and also the source assembly 310) is referred to as light pattern 355.

The output waveguide 320 receives the light pattern 355. The coupling element 350 couples the light pattern 355 from the source assembly 310 into the output waveguide 320. In embodiments where the coupling element 350 is diffraction grating, a pitch of the diffraction grating is chosen such that total internal reflection occurs in the output waveguide 320, and the light pattern 355 propagates internally in the output waveguide 320 (e.g., by total internal reflection), toward the decoupling element 365.

The directing element 360 redirects the light pattern 355 toward the decoupling element 365 for decoupling from the output waveguide 320. In embodiments where the directing element 360 is a diffraction grating, the pitch of the diffraction grating is chosen to cause incident light pattern 355 to exit the output waveguide 320 at angle(s) of inclination relative to a surface of the decoupling element 365.

In some embodiments, the directing element 360 and/or the decoupling element 365 are structurally similar. The image light 340 exiting the output waveguide 320 is expanded along one or more dimensions (e.g., may be elongated along x-dimension). In some embodiments, the waveguide display 300 includes a plurality of source assemblies 310 and a plurality of output waveguides 320. In such embodiments, each of the source assemblies 310 may be meant a monochromatic image light of a specific band of wavelength corresponding to a primary color (e.g., red, green, or blue). further, each of the output waveguides 320 may be stacked together with a distance of separation to output image light 340 that is multi-colored.

Figure 5:
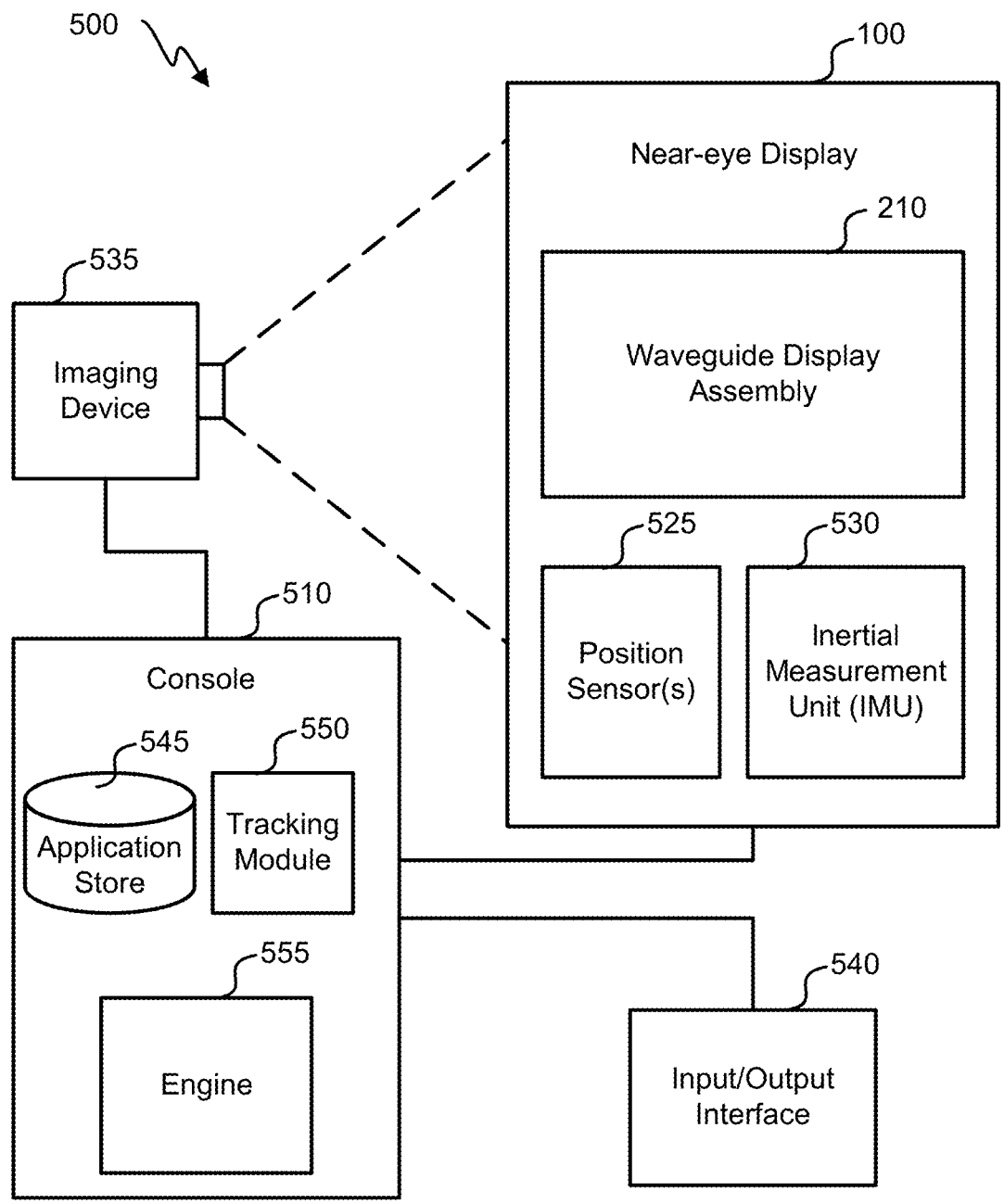
FIG. 5 is a block diagram of an embodiment of a system including a near-eye display.

FIG. 5 is a block diagram of certain electrical and optical components of a an embodiment of a system 500 including the near-eye display 100. The system 500 comprises the near-eye display 100, an imaging device 535, and an input/output interface 540 that are each coupled to a console 510.

The near-eye display 100 is a display that presents media to a user. Examples of media presented by the near-eye display 100 include one or more images, video, and/or audio. In some embodiments, audio is presented via an external device (e.g., speakers and/or headphones) that receives audio information from the near-eye display 100 and/or the console 510 and presents audio data based on the audio information to a user. In some embodiments, the near-eye display 100 may also act as an AR eyewear glass. In some embodiments, the near-eye display 100 augments views of a physical, real-world environment, with computer-generated elements (e.g., images, video, sound, etc.).

The near-eye display 100 may include a waveguide display assembly 210, one or more position sensors 525, and/or an inertial measurement unit (IMU) 530. The waveguide display assembly 210 may additionally or alternatively include the source assembly 310, the output waveguide 320, and the controller 330.

The IMU 530 may comprise an electronic device that generates fast calibration data indicating an estimated position of the near-eye display 100 relative to an initial position of the near-eye display 100 based on measurement signals received from one or more of the position sensors 525.

The imaging device 535 may generate slow calibration data in accordance with calibration parameters received from the console 510. The imaging device 535 may include, for example, one or more cameras and/or one or more video cameras.

The input/output interface 540 comprises a device that allows a user to send action requests to the console 510. Here, action request may comprise a request to perform a particular action. For example, an action request may be to start or end an application or to perform a particular action within the application.

The console 510 provides media to the near-eye display 100 for presentation to the user in accordance with information received from one or more of: the imaging device 535, the near-eye display 100, and the input/output interface 540. In the example shown in FIG. 5, the console 510 includes an application store 545, a tracking module 550, and an engine 555.

The application store 545 stores one or more applications for execution by the console 510. An application is a group of instructions, that when executed by a processor, generates content for presentation to the user. Examples of applications include: gaming applications, conferencing applications, video playback application, or other suitable applications.

The tracking module 550 may calibrate the system 500 using one or more calibration parameters and may adjust one or more calibration parameters to reduce error in determination of the position of the near-eye display 100.

The tracking module 550 may track movements of the near-eye display 100 using slow calibration information from the imaging device 535. The tracking module 550 may also determine positions of a reference point of the near-eye display 100 using position information from the fast calibration information.

The engine 555 may execute applications within the system 500 and receives position information, acceleration information, velocity information, and/or predicted future positions of the near-eye display 100 from the tracking module 550. In some embodiments, information received by the engine 555 may be used for producing a signal (e.g., display instructions) to the waveguide display assembly 210 that determines a type of content presented to the user.

Because the near-eye display 100 may be worn by a user, the design may employ features to accommodate this use case, such as being lightweight and low power. With this in mind, some embodiments may utilize a source assembly (e.g., source assembly 310 of FIGS. 3-4) that utilizes a mirror scanning system in which the mirror is used to scan one or more light sources (e.g., source 410 of FIG. 4) to create an output light pattern (e.g., light pattern 355 of FIG. 4).

Figure 6:
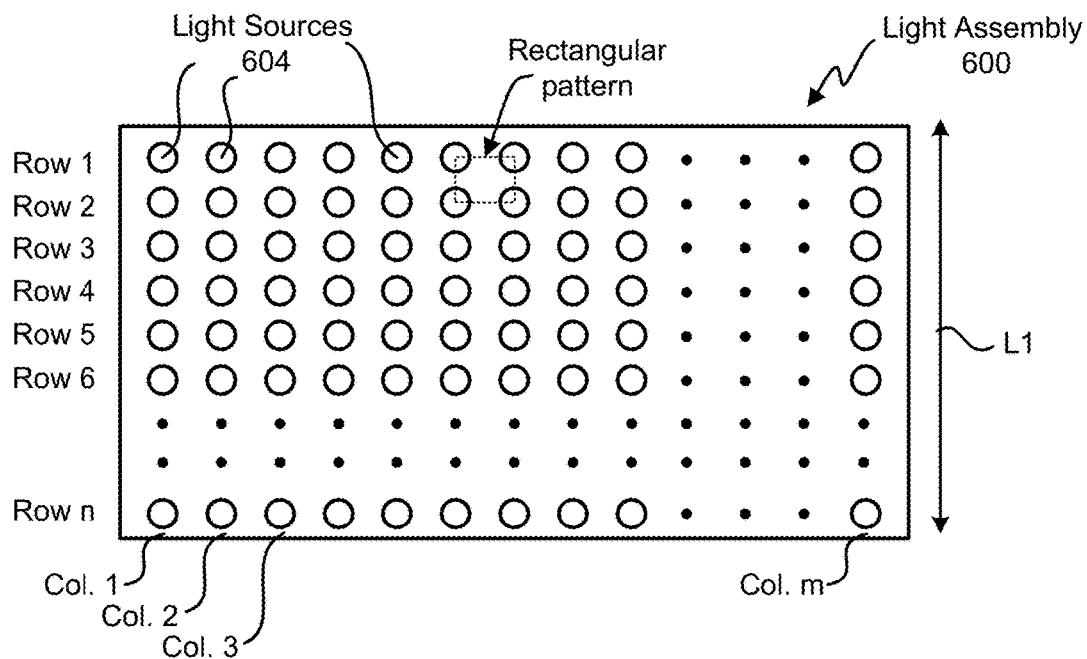
FIG. 6 is a diagram of an embodiment of a light assembly for an augmented reality display.

FIG. 6 is a diagram of an embodiment of a light assembly 600 that can be utilized in such a mirror scanning system. The light assembly 600 (which may correspond to source 410 of FIG. 4) comprises an array, or pattern, of light sources 604, each of which may emit light of a particular color or wavelength band. In some embodiments, light sources 604 may comprise lasers or LEDs (e.g., micro LEDs), which can be placed or otherwise fabricated on a common substrate, or "chip." (As used herein, the term "chip" is directed an array or group of light sources packaged together with electrical interconnects for accessing the light sources. Additional embodiments below describe how a light assembly 600 may comprise multiple chips. In some embodiments, the light sources 604 may be arranged in rows and columns. For example, as shown in FIG. 6, the light assembly 600 may include row 1, row 2, row 3, row 4, row 5, row 6 to row n; column 1, column 2, column 3, to column m of the light assembly 600, as illustrated. In some embodiments, twelve rows are used in the light assembly 600; four rows of light sources 604 have red LEDs, four rows of light sources 604 have green LEDs, and four rows of light sources 604 have blue LEDs. In some embodiments, 3 to 7 rows of light sources 604 are used for one color in the light assembly 600. Other embodiments may vary.

It can be noted that, although the array of light sources 604 of the light assembly 600 of FIG. 6 forms rectangular patterns of light sources 604 (in which light sources 604 from all rows are aligned into columns), embodiments are not so limited. As described in additional detail below, alternative embodiments of a light assembly 600 may include arrays of light sources 604 that form hexagonal or other patterns, which may result in some rows or columns of light sources 604 not aligning with other rows or columns. (As used herein, therefore, the terms "row" and "column", when used to refer to light sources 604 of a light assembly 600, are used to refer to subsets of light sources 604 of the light assembly 600 that align to illuminate corresponding pixels along scan lines (e.g., columns) of an output light pattern (e.g., an image or pattern of light used to create an image), as described herein below.) It can be further noted that light sources 604 may emit light in a circular pattern, which can be useful when phasing light sources 604 of one row and/or column with another row and/or column. Even so, in alternative embodiments light sources may additionally or alternatively be noncircular.

Figure 7:
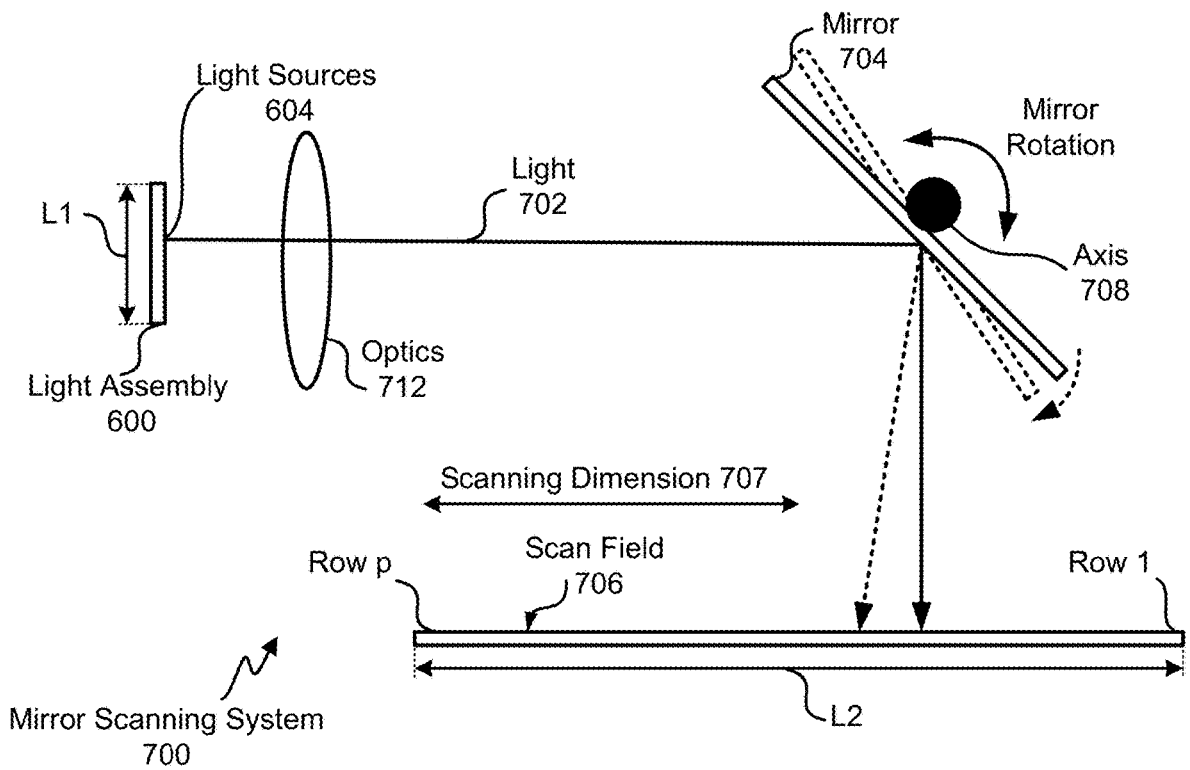
FIG. 7 is a diagram of an embodiment of a mirror scanning system that may be utilized in a near-eye display.

FIG. 7 is a diagram of an embodiment of a mirror scanning system 700 that may be utilized in a source assembly (e.g. source assembly 310 of FIGS. 3-4) of a near-eye display (e.g., near-eye display 100 of FIG. 1), illustrating how a light assembly 600 may be scanned by a mirror 704 to project an output light pattern in a scan field 706. In the illustrated embodiment, the mirror scanning system 700 comprises the light assembly 600, mirror 704, and optics 712. Scan field 706 may comprise a virtual image plane where an output light pattern is provided (and where a waveguide or other optical element may be placed to receive the output light pattern, as indicated in previous embodiments).

The operation of the mirror scanning system 700 may proceed generally as follows. During a scanning period, light 702 emitted from light sources 604 of the light assembly 600 can be reflected off of mirror 704 onto the scan field 706. The mirror 704 rotates about an axis 708 (as illustrated by dotted lines) to direct the light 702 at different angles to illuminate different portions of the scan field 706 along a scanning dimension 707 over the course of the scanning period. Thus, the mirror 704 "scans" the light assembly 600 over the course of the scanning period by rotating to redirect light 702 from the light assembly 600 over the entire scan field (e.g., row 1 to row p) along the scanning dimension 707. The light assembly 600 can emit different patterns of light at different times to illuminate the scan field 706, to create an output light pattern, which may be an image or precursor to an image. The output light pattern may correspond with light pattern 355 of FIG. 4, and may therefore be provided to a coupling element 350 of an output waveguide 320 to form the image light 340 provided to a user's eye.

The type of mirror 704 used to scan the light assembly 600 may vary, depending on desired functionality. In some embodiments, for example, the mirror 704 may comprise a scanning MEMS mirror configured scan the light assembly 600 by oscillating back and forth to reflect light along the scanning dimension. In other embodiments, the mirror 704 may comprise a spinning mirror (e.g., a multi-faceted mirror) configured to spin about an axis to scan the light assembly 600 in one direction along the scanning dimension. Other embodiments may vary. Accordingly, the "rotation" of the mirror 704 about an axis as described herein may comprise partial rotation (e.g., oscillation) and/or full rotation (e.g., spinning).

Optics 712 may be used to collimate and/or focus light from the light assembly 600 to the mirror 704 and/or to the scan field 706. Optics 712 and mirror 704 may correspond to the optics system 415 of FIG. 4. The optics 712 may therefore include one or more lenses, gratings, apertures, and/or other optical elements as described with regard to FIG. 4 above.

As previously indicated, the scan field 706 is illuminated with an output light pattern over the course of a scanning period. The output light pattern can be divided into an array of output pixels, divided into rows and columns. (In the embodiment illustrated in FIG. 7, scan field 706 has row 1 to row p.) Each pixel in the output light pattern may be illuminated by one or more light sources 604 in a corresponding column of the light assembly 600 over the course of a scanning period. As described in further detail below with regard to FIGS. 8-9, as the mirror 704 rotates, light sources 604 of the light assembly 600 can flash at certain times during the scanning period to illuminate respective pixels of the output light pattern in the scan field 706. The mirror 704 rotates to redirect light 702 along a scanning dimension 707 such that columns of light sources 604 along the length L1 of the light assembly illuminate respective columns of pixels of the output light pattern in the scan field 706. Due to the mirror 704 rotation, each light source 604 of a column in the light assembly 600 is available to illuminate a corresponding pixel in the output light pattern. In some embodiments, the length L2 of the scan field 706 may exceed the length L1 of the light assembly 600 and/or the number of rows of pixels the output light pattern along length L2 may exceed the number of rows of light sources 604 along length L1 of the light assembly. In some embodiments, for example, the number of rows, p, in the output light pattern of the scan field 706 may be 50 to 10,000 times greater the number of rows, n, and the light assembly 600. (In embodiments, such as those described herein, in which the mirror 704 rotates to scan the light assembly 600 along a single scanning dimension 707, the number of columns in the output light pattern may therefore correspond with the number of columns, m, in the light assembly 600. That said, in alternative embodiments, mirror 704 may be configured to scan along two dimensions, in which case the number of columns in the output light pattern may be greater or fewer than the number of columns, m, in the light assembly 600.)

The speed at which the mirror 704 rotates can vary, depending on desired functionality. According to some embodiments, the rotation speed of the mirror 704 can correspond with a refresh rate of the near-eye display, which may occur several times (e.g., dozens or more) per second. In some embodiments, the mirror 704 may over rotate (e.g., continue rotating after the light 702 has illuminated the full scan field) to allow the mirror to "ramp down" its rotation speed and "ramp up" its rotation speed and opposite direction. This can allow for a relatively uniform scanning speed across the scan field 706. Because the mirror 704 can rotate in both directions (as indicated by the "mirror rotation" arrow in FIG. 7), the mirror scanning system 700 may be configured to scan light 702 from the light assembly 600 to the scan field 706 in both directions.

Depending on desired functionality, a full scan of the scan field 706 (e.g., the illumination of all pixels in an output light pattern in the scan field 706) over the course of a scanning period may be performed in a single pass (rotation) of the mirror 704, or multiple passes of the mirror 704. In some embodiments, for example, all rows of pixels in an output light pattern are illuminated in a single pass of the mirror 704. In other embodiments, the scanning may be interleaved to illuminate, for example, even rows of the output light pattern in a first pass of the scan field 706 in one direction along the scanning dimension 707, then illuminate odd rows of the output light pattern in a second pass of the scan field 706 in the opposite direction along the scanning dimension 707.

Figure 8:
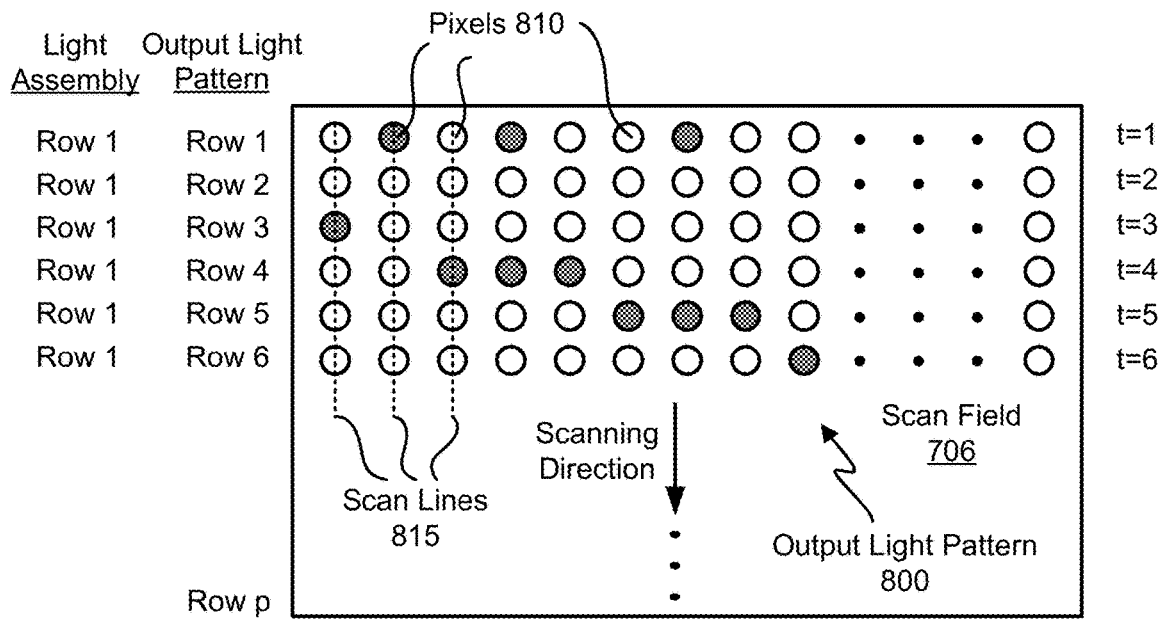
FIG. 8 is a diagram of an example output light pattern in a scan field.
Figure 9:
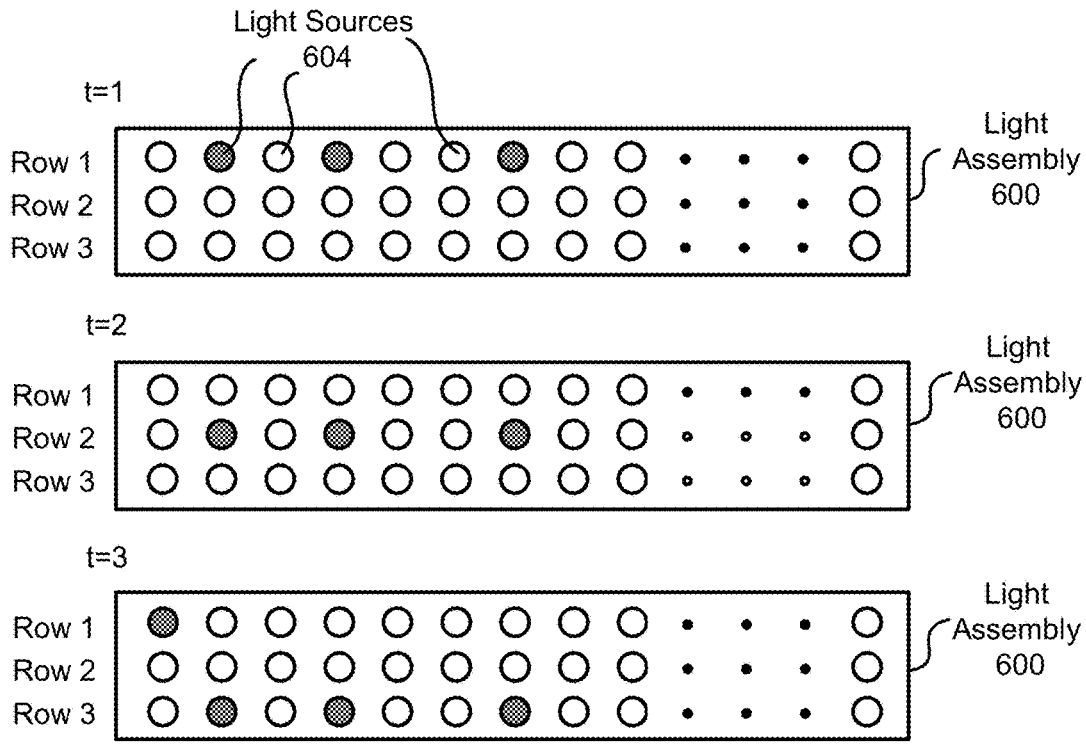
FIG. 9 depicts how a light assembly may emit light to begin to form the output light pattern illustrated in FIG. 8.

FIGS. 8 and 9 are provided to illustrate how a light assembly 600 can be used to form an output light pattern 800 in a scan field 706 over time. (Here, for convention, darkened circles in FIGS. 8-9 represent illuminated light sources and pixels.) FIG. 8 is a diagram showing an overhead view of an output light pattern 800 in a scan field 706, comprising a plurality of pixels 810 disposed along a plurality of scan lines 815. The output light pattern 800 is illuminated as the mirror 704 rotates over the course of a scanning period. As explained in additional detail below, light sources 604 illuminate pixels 810 in corresponding scan lines 815, where each light source 604 of the light assembly 600 is available to illuminate one or more pixels 810 in a respective scan line 815 of the output light pattern 800 over the course of a scanning period. As the mirror 704 rotates during a scanning period, a light source 604 may remain off until the mirror 704 is positioned to direct light from the light source 604 to a corresponding pixel 810, at which point the light source 604 can emit a flash of light to illuminate the corresponding pixel 810.

In the embodiment illustrated in FIG. 8, as the mirror 704 rotates in time, row 1 of the light assembly 600 aligns with different rows of the output light pattern 800 as indicated in the figure. For example, at time t=1, row 1 of the light assembly 600 aligns with row 1 of the output light pattern 800; at time t=2, row 1 of the light assembly 600 aligns with row 2 of the output light pattern 800; at time t=3, row 1 of the light assembly 600 aligns with row 3 of the output light pattern 800; at time t=4, row 1 of the light assembly 600 aligns with row 4 of the output light pattern 800; at time t=5, row 1 of the light assembly 600 aligns with row 5 of the output light pattern 800; at time t=6, row 1 of the light assembly 600 aligns with row 6 of the output light pattern 800; and so on. Scanning in this manner enables the light assembly 600 to illuminate the entire scan field 706 with a complete output light pattern 800 (e.g., illuminating rows 1 through p). It can be noted that, in the diagrams illustrated in FIGS. 8 and 9, the orientation of the light assembly 600 is upside down relative to the output light pattern 800. (In alternative embodiments, the orientation may be different, depending on factors such as the optics 712 and orientation of the light assembly.) Thus, as row 1 of the light assembly 600 aligns with various rows of the output light pattern 800, other rows of the light assembly 600 also align with respective rows of the output light pattern 800 over the course of the scanning period. At time t=2, for example, as row 1 of the light assembly 600 aligns with row 2 of the output light pattern 800, row 2 of the light assembly 600 aligns with row 1 of the output light pattern 800. At time t=3, rows 1, 2, and 3 of the light assembly 600 align with rows 3, 2, and 1 of the output light pattern 800, respectively. This manner of illumination continues over the course of the scanning period. And thus, as previously indicated, each light source 604 is available to illuminate any or all pixels 810 in a corresponding scan line 815 of the output light pattern 800 over the course of the scanning period.

FIG. 9 depicts how an embodiment of a light assembly 600 may emit light at times t=1, t=2, and t=3, to begin to form the output light pattern 800 illustrated in FIG. 8. At time t=1, row 1 of the light assembly 600 is aligned with row one of the output light pattern 800 (and, because it is the beginning of the scan, other rows of the light assembly 600 do not yet align with any rows of these output light pattern 800). Three light sources 604 of row 1 of the light assembly 600 emit light to illuminate respective three pixels 810 in row 1 of the output light pattern 800; row 2 and row 3 of the light assembly 600 have no light sources 604 on. At time t=2, row 2 of the light assembly 600 is aligned with row 1 of the output light pattern 800, and therefore three light sources 604 of row 2 emit light to illuminate the same three pixels 810 of row 1 of the output light pattern 800 that were illuminated by row 1 of the light assembly 600 at time t=1. At time t=3, row 3 of the light assembly 600 is aligned with row 1 of the output light pattern 800, and therefore illuminates the three pixels 810 of row 1 of the output light pattern 800. Also, because row 1 of the light assembly 600 is now aligned with row 3 of the output light pattern 800, a light source 604 of the light assembly 600 is used to illuminate a corresponding pixel in row 3 of the output light pattern 800. The movement of the mirror 704 and the timing of the illumination of the pixels 810 by the light sources 604 are synchronized so that the output light pattern 800 appears to be static in the scan field 706. In some embodiments, the timing of the illumination and the arrangement of the light sources 604 on the light assembly 600 may be configured to provide for higher resolution of pixels 810 in the output light pattern 800. It can be noted that, although the light assembly 600 of FIG. 9 has only three rows in this example, the output light pattern of FIG. 8 could be created with a light assembly having any number of rows.

Figure 10:
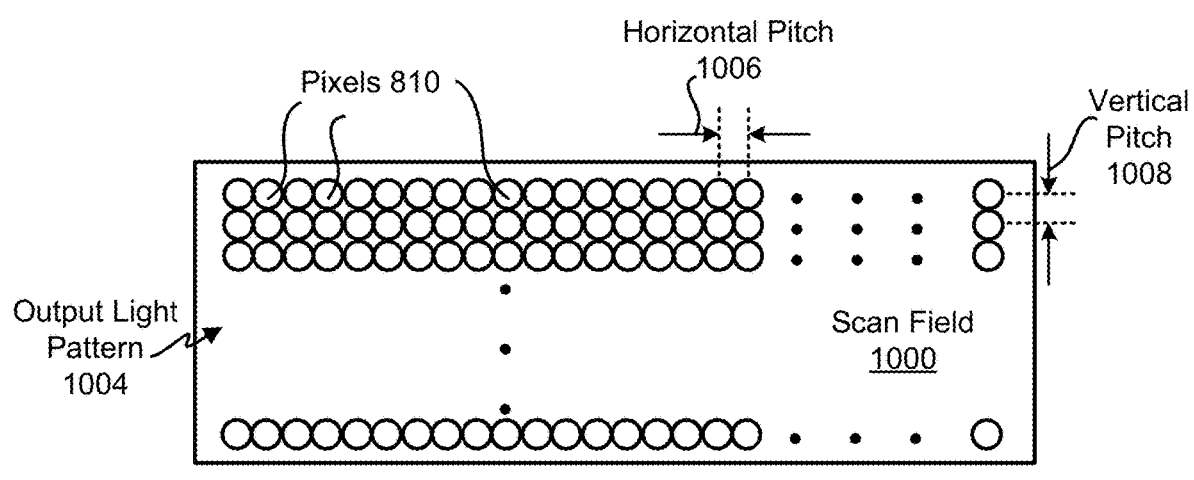
FIG. 10 is an illustration an embodiment of a scan field in which an output light pattern has super resolution.

FIG. 10 is an illustration an embodiment of a scan field 1000 in which an output light pattern 1004 has high resolution or "super resolution." Due to manufacturing and/or other limitations, the density of the light sources 604 in the light assembly 600 may be limited. Nonetheless, embodiments may provide for a "super resolution" in which the effects of these limitations may be mitigated in the resulting output light pattern 1004. In particular, pixels 810 in an output light pattern 1004 with super resolution may have a horizontal pitch 1006 and/or a vertical pitch 1008 that is smaller than respective horizontal or vertical pitches of the light assembly (e.g., light assembly 600 in FIG. 9) used in the scanning process. The decrease in vertical pitch 1008 can be achieved by flashing light sources 604 more frequently over the course of a scanning period, increase the number of resulting vertical pixels in the output light pattern 1004 (e.g., increasing from 1080 to 2160). The decrease in horizontal pitch 1006 can be achieved offsetting pixels in the light assembly as illustrated in the embodiments of FIGS. 11-12.

Figure 11:
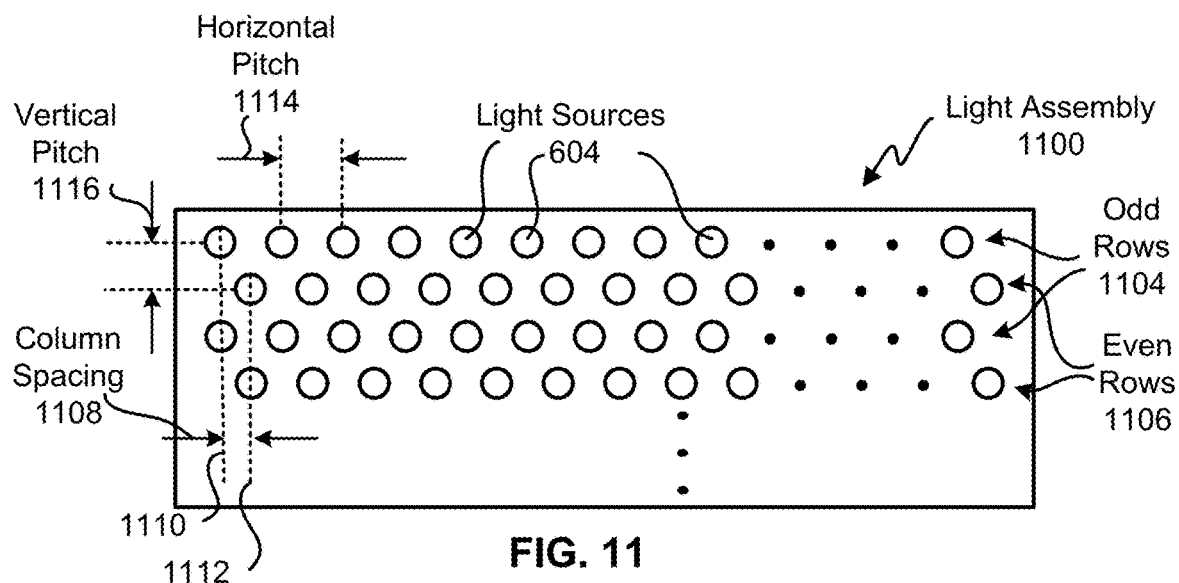
FIG. 11 is an illustration of a first embodiment of a light assembly that can be used to provide super resolution.

FIG. 11 is an illustration of a first embodiment of a light assembly 1100 that can be used to provide super resolution. Here, light sources 604 are arranged in offset rows, such that odd rows 1104 are offset from even rows 1106. As such, a column spacing 1108 between columns is reduced. This results in a corresponding horizontal pitch 1006 of pixels 810 in an output light pattern (e.g., as illustrated in FIG. 10), and an increase in row resolution of the output light pattern. It can be noted, however, that columns in the light assembly 1100 (e.g., columns 1110 and 1112) are formed from light sources 604 from every other row (rather than every row). A duty cycle with which light sources 604 are illuminated may therefore be adjusted and/or a number of rows in the light assembly 1100 may be increased to ensure that scan lines of the output light pattern 1004 are properly illuminated. The horizontal pitch 1114 (i.e., a distance between the centers of adjacent light sources 604 in the same row) and vertical pitch 1116 (i.e., distance between the centers of adjacent light sources in adjacent rows) spacing may vary, depending on manufacturing limitations, desired functionality, and/or other factors. In some embodiments, for example, horizontal pitch 1114 is 4.5 μm, and a vertical pitch 1116 is 5 μm. One or both of these dimensions can vary in alternative embodiments.

Figure 12:
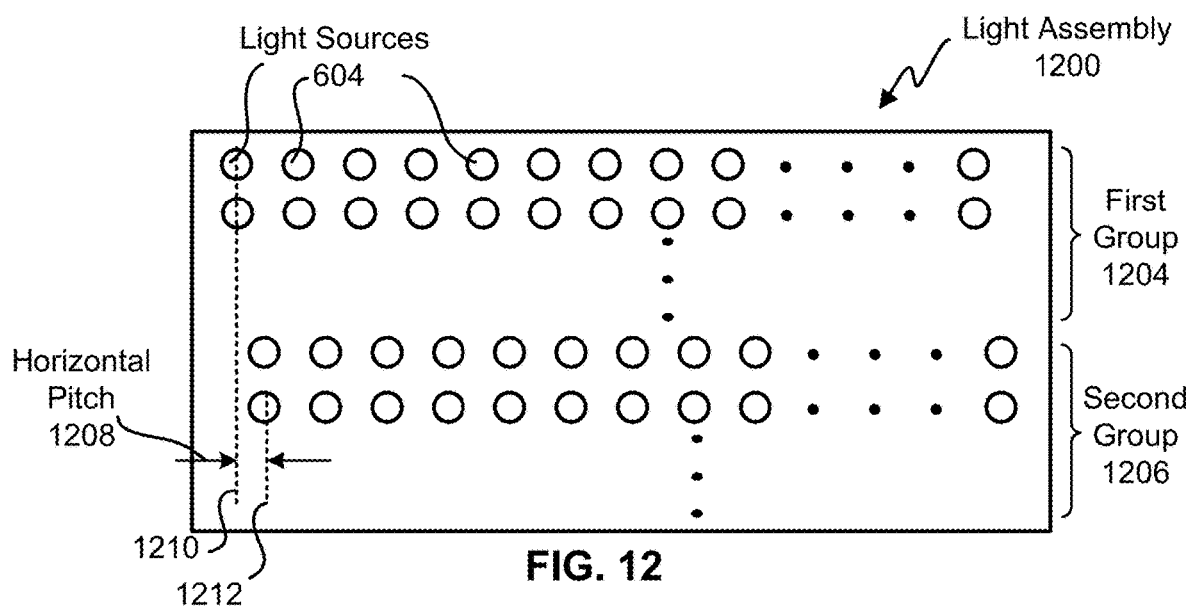
FIG. 12 is an illustration of a second embodiment of a light assembly that can be used to provide super resolution.

FIG. 12 is an illustration of a second embodiment of a light assembly 1200 that can be used to provide super resolution. Here, light sources 604 are arranged in offset rows, where a first group of adjacent rows 1204 is offset from a second group of adjacent rows 1206, resulting in a reduced horizontal pitch 1208 between columns (e.g., columns 1210 and 1212) in a manner similar to the embodiment illustrated in FIG. 11. This similarly results in a corresponding horizontal pitch 1006 of pixels 810 in a on output light pattern 1004 (e.g., as illustrated in FIG. 10). Again, columns are formed from only a portion of the rows in the light assembly 1200, so adjustments in the design may be made to accommodate this.

The embodiments in FIGS. 11-12 are meant to serve only as examples, and are not meant to be exhaustive. Super resolution may be attained using similar techniques with any of a variety of arrangements of light sources 604 on a light assembly. For example, rather than having two sets or groups of offset rows, alternative embodiments may have light assemblies that have more than two groups of offset rows. Embodiments may additionally or alternatively offset columns in a similar manner to reduce a vertical pitch, if desired. According to some embodiments, a way in which data is communicated through circuitry controlling the light sources 604 may impact how light sources 604 are arranged. A person of ordinary skill in the art will appreciate various alternative arrangements.

Referring again to FIGS. 8 and 9, as pixels 810 of the output light pattern 800 are illuminated by different light sources 604 over the course of a scanning period, a user may not perceive any flashing in an image corresponding to the output light pattern 800. Instead, the user's eye may integrate the illumination of pixels 810 over time. If a light source 604 in a column of the light assembly 600 stops working, a duty cycle and/or amplitude of light emitted by other light sources 604 in the same column of the light assembly 600 can be increased to ensure that the brightness of pixels 810 in a corresponding scan line 815 appears consistent to the user.

Alternatively or additionally, this redundancy may be used to support increased power efficiency. For example, in order to obtain a desired range of brightness, a light source 604 may be driven at a corresponding range of current. The light-output efficiency of the light source 604 may be higher over one portion of that current range than another. Rather than using the entire current range to drive the light source 604, it may be more power-efficient to drive the light source 604 within the current range for which it is most efficient, and to drive other light sources 604 in the same column of the light assembly 600 in the same power-efficient fashion, to obtain the desired brightness at a particular pixel 810 of the output light pattern 800.

Figure 13:
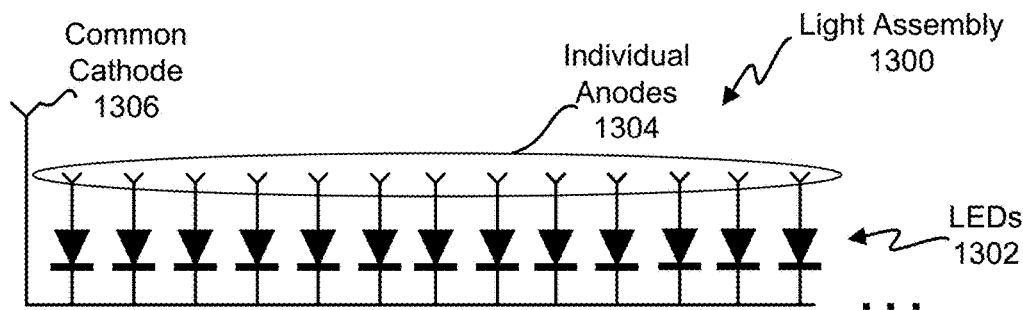
FIG. 13 is a schematic diagram of an embodiment of a light assembly.
Figure 14:
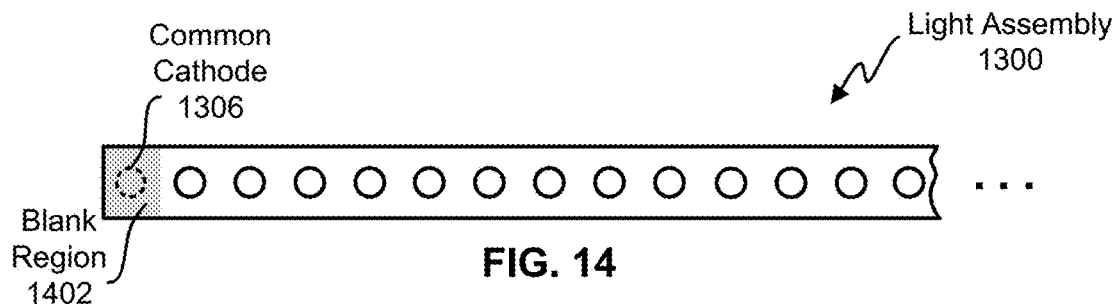
FIG. 14 is a top view of a the light assembly of FIG. 13.

FIGS. 13 and 14 illustrate a light assembly 1300 comprised of a single common cathode chip. FIG. 13 is a schematic diagram of an embodiment of the light assembly 1300 (having only a single row, for simplicity). Here, the light sources comprise LEDs 1302 having individual anodes 1304 and a common cathode 1306. (Alternative embodiments may have a different configuration of electrodes, depending on desired functionality. It can be further noted that, although the embodiments described in FIGS. 13-16 comprise LEDs as the light sources, similar concepts may apply to light sources of other types.)

FIG. 14 is a top view of the light assembly 1300 of FIG. 13. Here, LEDs 1302 are disposed along a front surface of the light assembly 1300, with corresponding electrical contacts (not shown) for the individual anodes 1304 of the LEDs 1302 on a back surface behind each respective LED 1302. The use of a common cathode 1306 (which also may be disposed on the back surface of the light assembly 1300) may result in a blank region 1402 on the front surface of the light assembly 1300 in which an LED 1302 is not disposed. (The cathode 1306 on the back surface is represented by a dotted line, and the blank region 1402 is represented by a shaded region of the light assembly 1300.)

Figure 15:
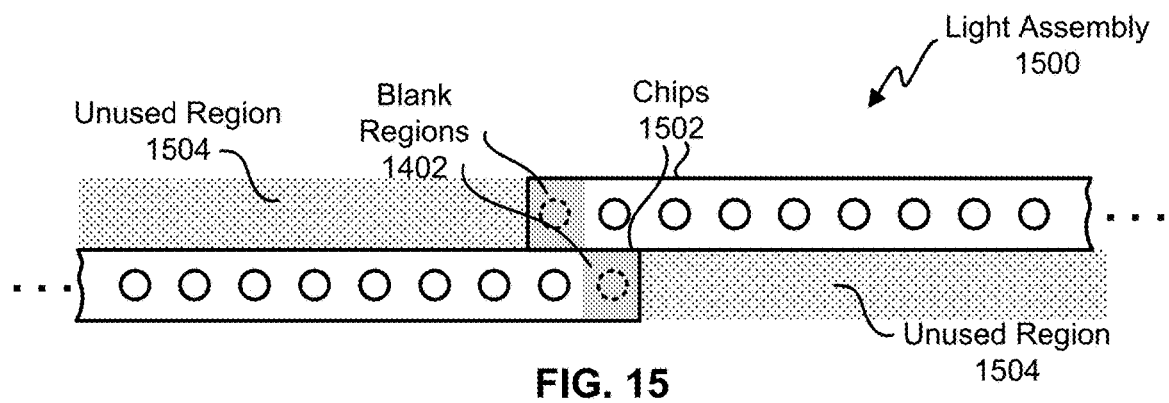
FIG. 15 is a top view of an embodiment of a light assembly in which multiple chips are used.

FIG. 15 is a top view of an embodiment of a light assembly 1500 in which multiple chips 1502 are arranged in staggered fashion to achieve uniformly spaced scan lines. Here, multiple chips 1502 are needed to form a light assembly with a sufficient number of columns to generate output light pattern 800. As can be seen in the figure, the chips 1502 are joined in a "staggered" fashion, as opposed to an "end-to-end" fashion. There may be different reasons for this. One reason may be that the physical packaging of each chip 1502 does not allow an LED to be placed too close to the edge of the chip 1502. Thus, if two chips 1502 are joined together in "end-to-end" fashion, the center-to-center distance between two adjacent LEDs positioned at respective ends of two adjacent chips may exceed the horizontal pitch of the output light pattern 800. Thus, to ensure uniformly spaced illumination of scan lines 815 in the resulting output light pattern 800, the chips 1502 shown in FIG. 15 are arranged to overlap (rather than a joined end-to-end). Problematically, however, this results in large unused regions 1504 in the light assembly 1500 that can undesirably double the size of the light assembly 1500 in the scanning dimension. (It can be noted that light assemblies having multiple rows results in similar inefficiencies.)

Figure 16:
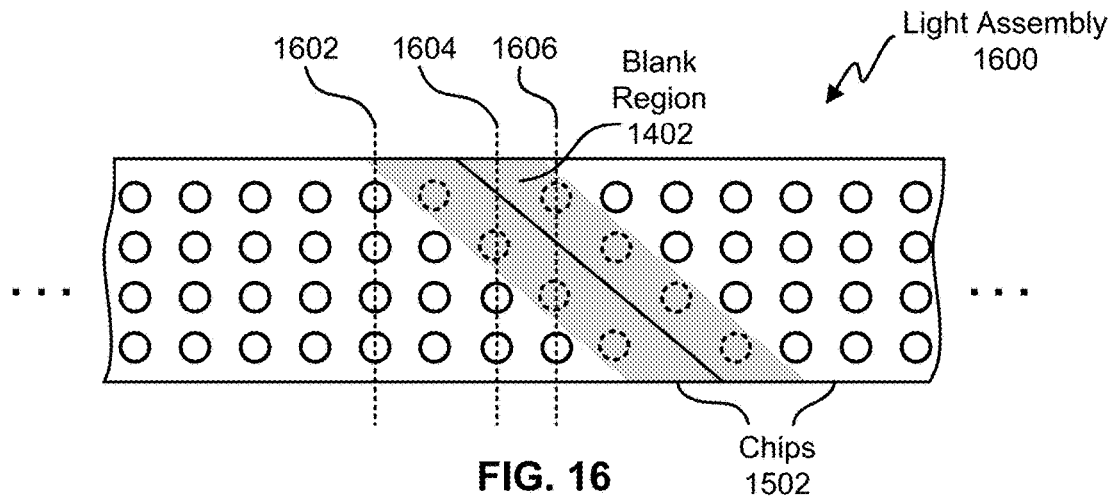
FIG. 16 is a top view of an embodiment of a light assembly comprising multiple nonrectangular, parallelogram-shaped.

FIG. 16 is a top view of an embodiment of a light assembly 1600. Here, the light assembly 1600 is comprised of multiple nonrectangular, parallelogram-shaped chips 1502 to eliminate unused regions 1504 similar to those in FIG. 15. A single blank region 1402 formed from the interface between the chips 1502 and the common cathodes of each chip extends across the rows of the light assembly 1600. However, this results in columns having a non-uniform amount of LEDs available to illuminate respective scan lines of the output light pattern 800. For example, column 1602 of FIG. 16 is illuminated by four LEDs, column 1604 is illuminated by two LEDs, and column 1606 is illuminated by a single LED.

Figure 17:
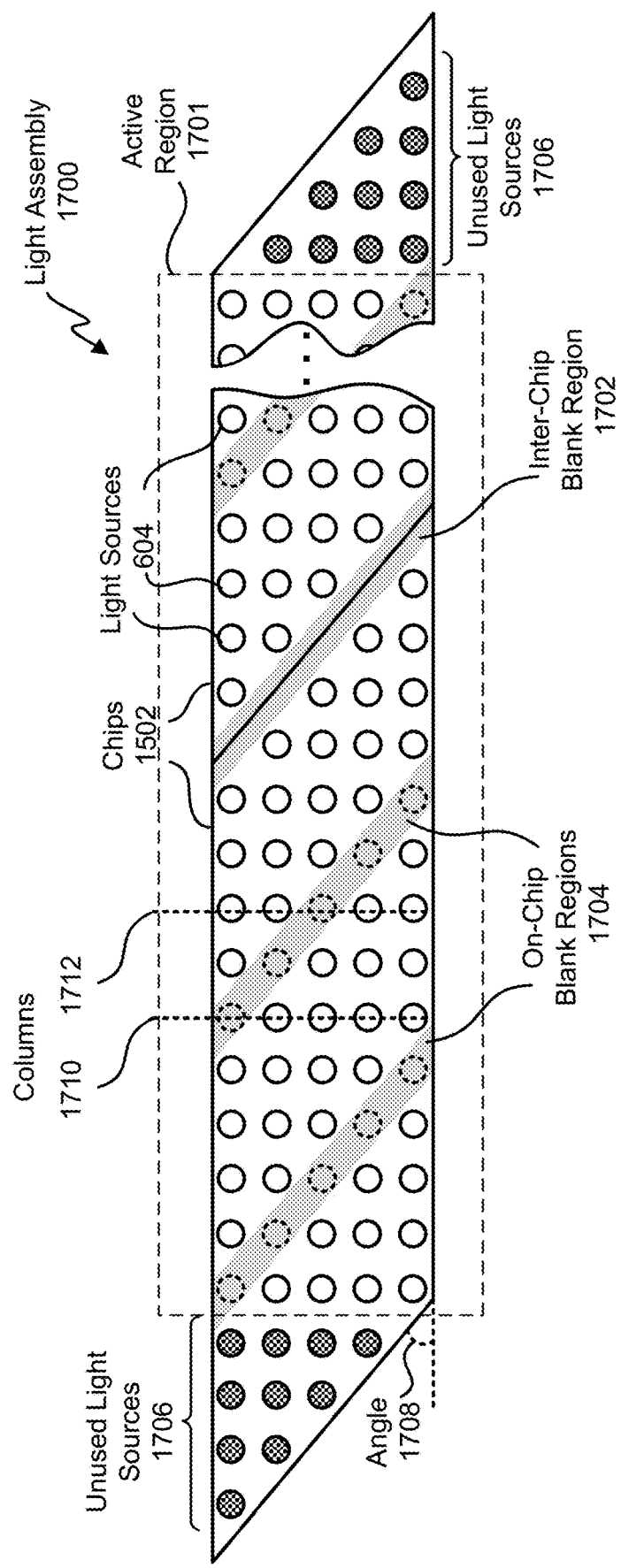
FIG. 17 is a top view of a first embodiment of a light assembly providing uniform illumination of scan lines in a corresponding output light pattern.

FIG. 17 is a top view of an embodiment of a light assembly 1700 that overcomes illumination non-uniformity by distributing blank regions uniformly across all columns of light sources 604 within an active region 1701 of the light assembly 1700. (Where the active region 1701 comprises the portion of the light assembly 1700 scanned by a mirror 704.) Here, an inter-chip blank region 1702 is formed at the interface where chips 1502 meet, extending diagonally through the rows of light sources 604 of the light assembly 1700. As mentioned previously, the inter-chip blank region 1702 may result from the fact manufacturing processes may limit how close to an edge of a chip 1502 the light sources 604 may come. This limits the number of light sources available for illuminating scan lines corresponding to columns of light sources 604 near the interface between the chips 1502. To ensure uniformity of illumination of scan lines corresponding to the other columns of light sources 604 of the light assembly 1700, on-chip blank regions 1704 are distributed evenly across the remaining columns of the light assembly 1700. These on-chip blank regions 1704 can mimic the of the inter-chip blank region 1702 by having substantially the same angle and substantially the same width as the inter-chip blank region. According to embodiments, these on-chip blank regions 1704 may correspond to locations where no light sources 604 are used during a scanning process to illuminate an output pattern. As such, these on-chip blank regions may comprise locations at which cathodes (and/or other electrodes) are located, where no light sources 604 are disposed (e.g., whether or not a cathode or other feature is otherwise present), and/or where light sources 604 may be disposed but are simply not used during the scanning process. In the embodiment illustrated in FIG. 17, each column of active light sources 604 within the active region 1701 comprises four light sources 604.

The light assembly 1700 is formed from a plurality of non-rectangular chips 1502. In particular, the chips 1502 of FIG. 17 are non-rectangular, parallelogram-shaped, although other non-rectangular shapes may be used in alternative embodiments. As such, there may be portions of the light assembly 1700 that fall outside of the active region 1701 scanned by a mirror 704 and used to create an output light pattern in a corresponding scan field. These portions may include unused light sources 1706. (In alternative embodiments, chips 1502 may be manufactured to exclude any light sources from these portions. Additionally or alternatively, these portions may be removed from the chips 1502, if desired.)

It can be noted that the width of the inter-chip blank region 1702 and on-chip blank regions 1704 may vary in alternative embodiments, depending on desired functionality. In light assembly 1700, for example, the width of the inter-chip blank region 1702 and on-chip blank regions 1704 is wide enough to effectively reduce the number of light sources 604 in a column by one. Put more generally, where each column of a light assembly 1700 (e.g. columns 1710 and 1712) would otherwise include a number, n, of light sources 604, the inter-chip blank region 1702 and on-chip blank regions 1704 act to reduce this number to n−1. However, in alternative embodiments, the width of the inter-chip blank region 1702 and on-chip blank regions 1704 may vary. As such, in alternative embodiments, inter-chip blank region(s) and on-chip blank region(s) of a light assembly may act to reduce the number, n, of light sources in a column of the light assembly to n-m, where m>=1.

It can further be noted that an angle 1708 of the edge slope of the chips 1502 may vary, depending on desired functionality. It can vary, for example, depending on a ratio of vertical and horizontal pitches of light sources, as well as how the light sources 604 are arranged within the array of light sources on each chip 1502. The embodiments illustrated in FIGS. 18-19 illustrate how this angle 1708 can vary.

Figure 18:
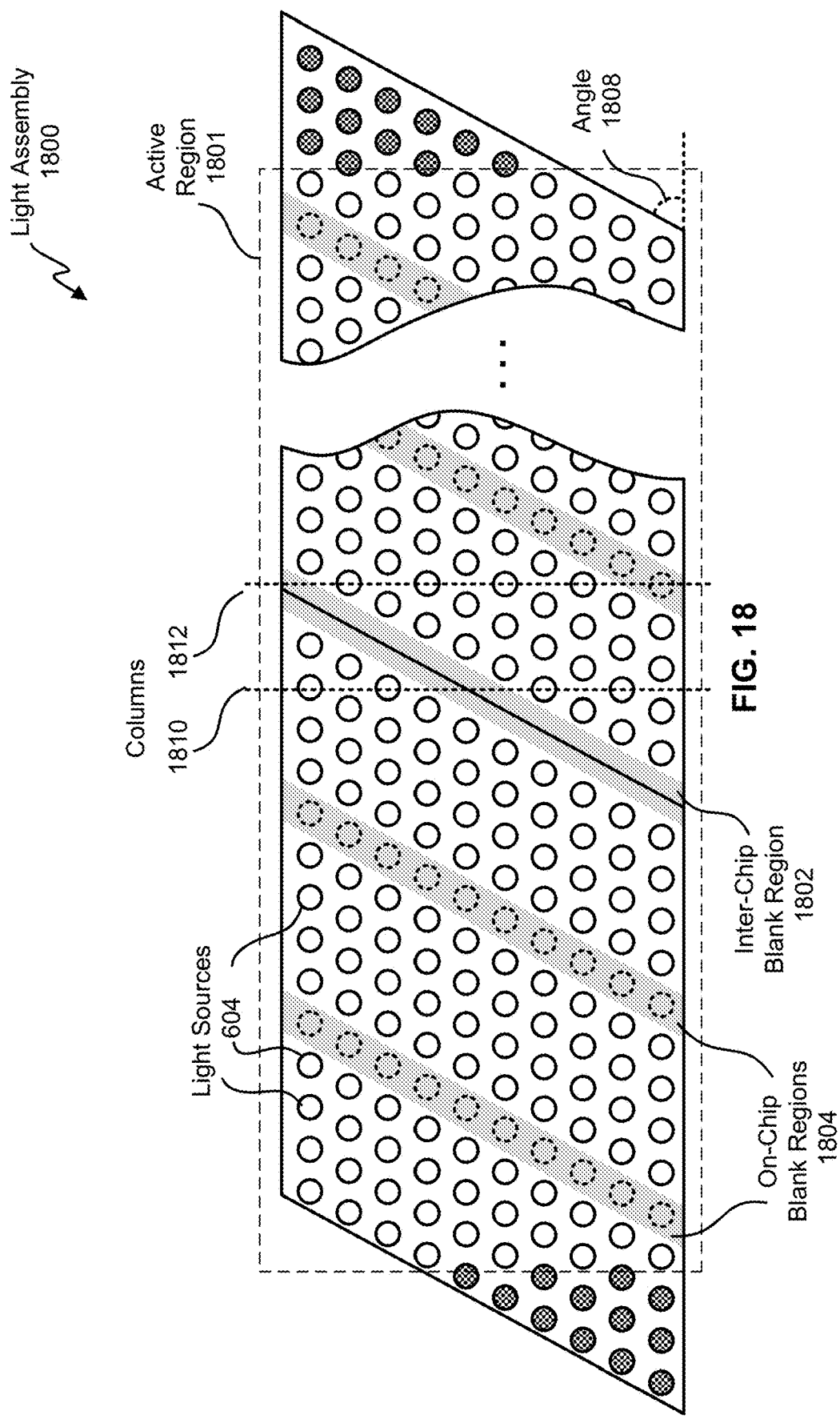
FIG. 18 is a top view of a second embodiment of a light assembly providing uniform illumination of scan lines in a corresponding output light pattern.

FIG. 18 is a top view of another embodiment of a light assembly 1700 providing uniform illumination of scan lines according to techniques described herein. Here, light sources 604 are disposed in offset rows to provide super resolution in a manner similar to the light assembly 1100 of FIG. 11. Similar to the light assembly 1700 of FIG. 17, the light assembly 1800 includes an inter-chip blank region 1802, along with a plurality of on-chip blank regions 1804 that mimic the pattern of the inter-chip blank region 1802 to ensure the number of light sources 604 for all columns (e.g., columns 1810 and 1812) is uniform, thereby helping ensure uniformity in the illumination of respective scan lines of the output light pattern. Additionally, the light assembly 1800 may include unused light sources outside an active region 1801.

In addition to the difference in the arrangement of the light sources 604, light assembly 1800 differs from light assembly 1700 in other ways. Angle 1808 of the edge slope of the light assembly 1800, for example, is different than angle 1708 of the light assembly 1700, due to the difference in the arrangement of light sources between these embodiments. And further, the edges from which angles 1808 and 1708 are formed slope in opposite directions. Additionally, light assembly 1800 has a larger amount of rows of light sources 604 than light assembly 1700. A person of ordinary skill in the art will appreciate that alternative embodiments may include different numbers of rows of light sources 604, different edge slope directions and/or angles, and the like.

Figure 19:
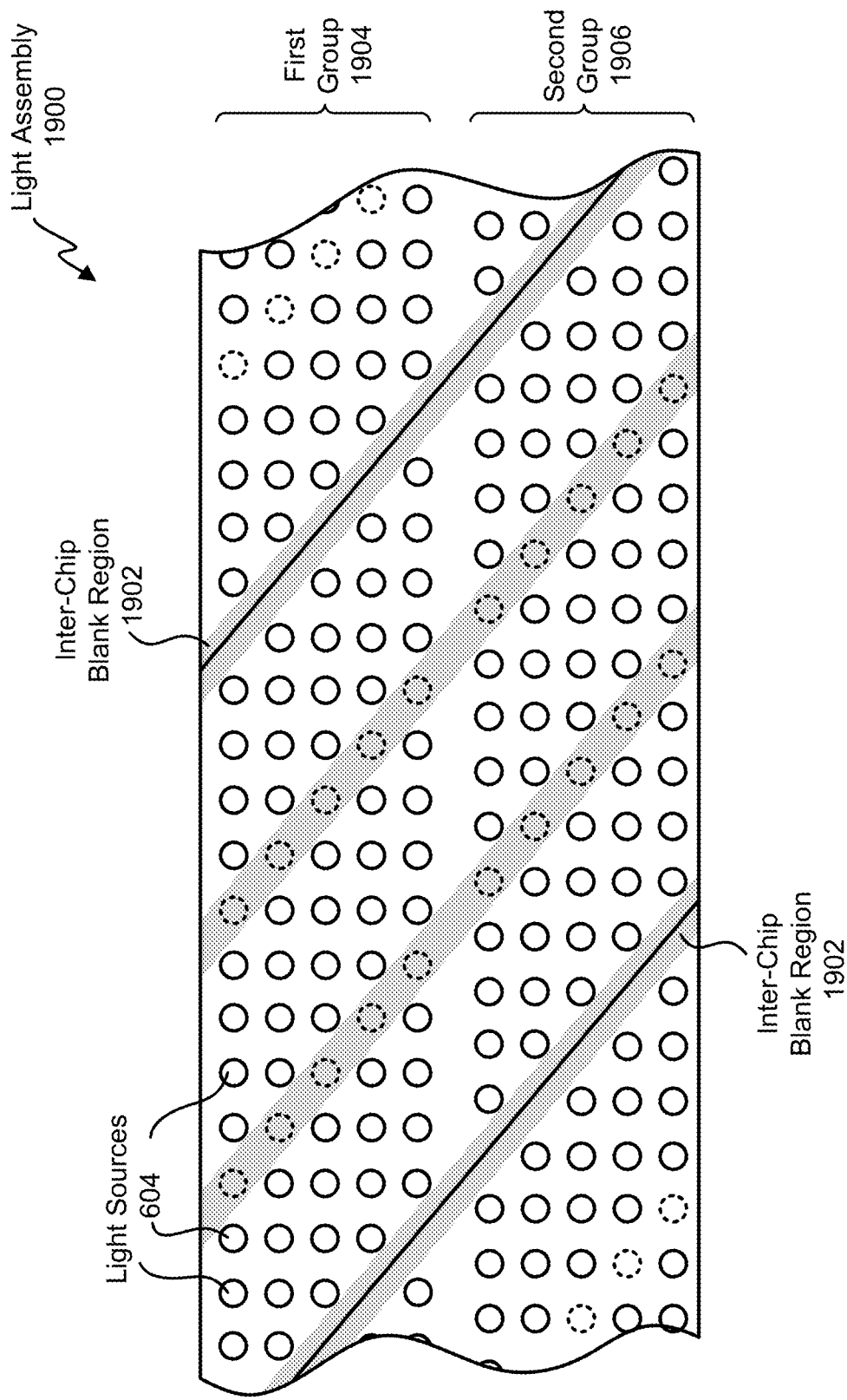
FIG. 19 is a top view of a third embodiment of a light assembly providing uniform illumination of scan lines in a corresponding output light pattern.

FIG. 19 is a top view of yet another embodiment of a light assembly 1900 providing uniform illumination of scan lines according to techniques described herein. Here, light sources 604 are disposed in a first group of rows 1904 and a second group of rows 1906, two provide super resolution in a manner similar to the light assembly 1200 of FIG. 12. Other illustrated features are similar to those illustrated in the light assemblies 1700 and 1800 in FIGS. 17 and 18, respectively. Unlike FIGS. 17 and 18, however, the illustration in FIG. 19 does not show the edges of an active region, but instead shows how embodiments may include a plurality of inter-chip blank regions 1902.

Figure 20:
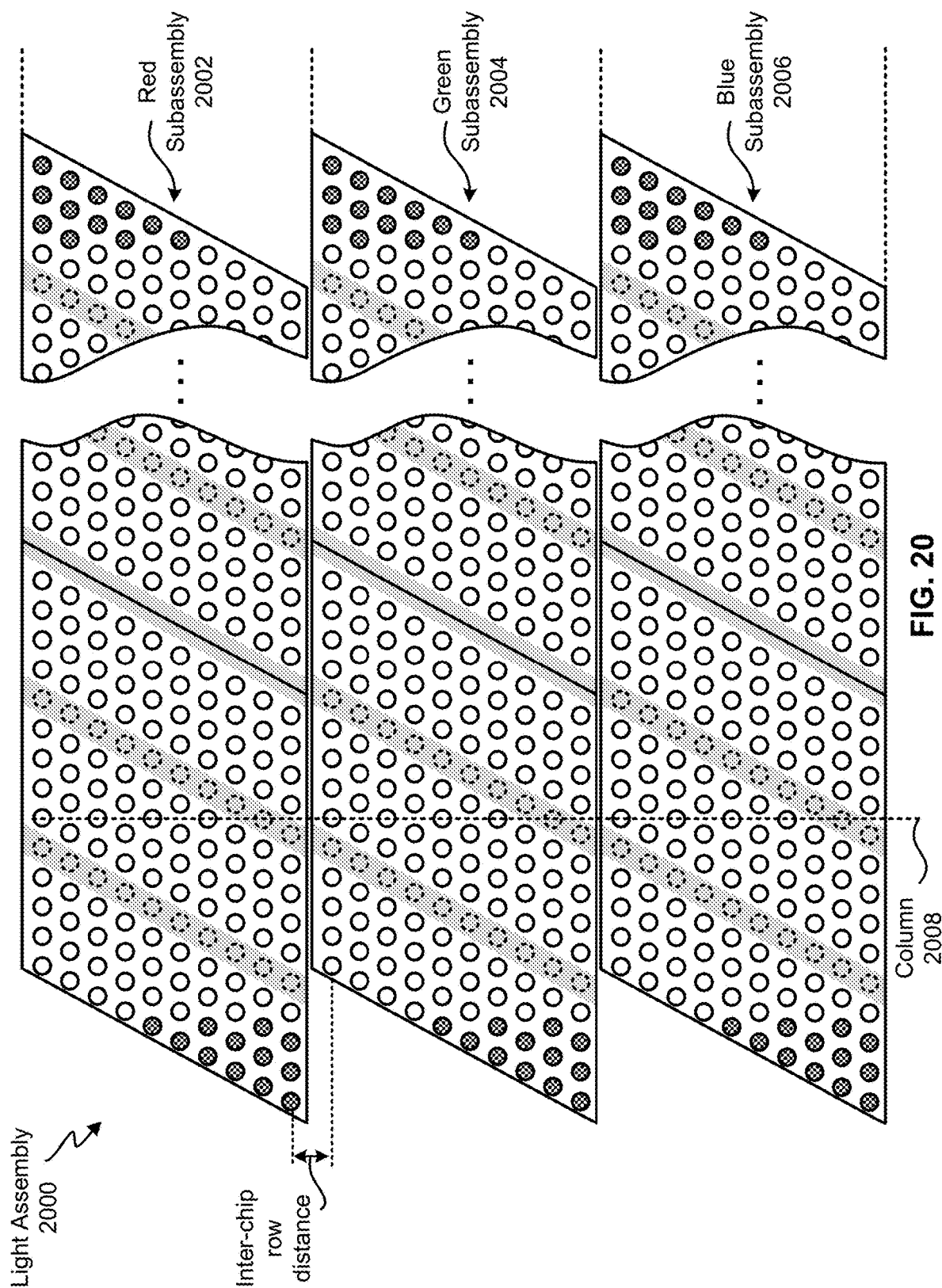
FIG. 20 is a top view of a third embodiment of a light assembly providing uniform and multicolor illumination of scan lines in a corresponding output light pattern.

FIG. 20 is a top view of an embodiment of a light assembly 2000 providing uniform illumination of scan lines according to techniques includes a red subassembly 2002 comprising light source is configured to emit red light, a green subassembly 2004 comprising light sources configured to emit green light, and a blue subassembly 2006 comprising light sources configured to emit blue light. According to some embodiments, the inter-chip row distance between rows of adjacent rows of chips may be larger than the distance between two rows on the same chip, and accounted for during scanning of the light assembly 2000 (e.g., to affect the timing of when impacted light sources flash). Chips of different colors may align in a column (e.g., column 2008) of multi-colored lights sources available to illuminate a corresponding scan line in an output light pattern. A duty cycle and/or intensity of different light sources along the column 2008 can determine the brightness and intensity of each pixel along the scan line.

The individual chips in an array (e.g., light assembly 2000) may be pick-and-placed for mounting on a common substrate. While chips of the same color may originate from the same wafer, it is typical that different technologies may be used to produce emitters of different colors (e.g., gallium arsenide (GaAs) for red emitters, gallium nitride (GaN) for green and blue emitters), such that chips of different colors may originate from different wafers.

Figure 21:
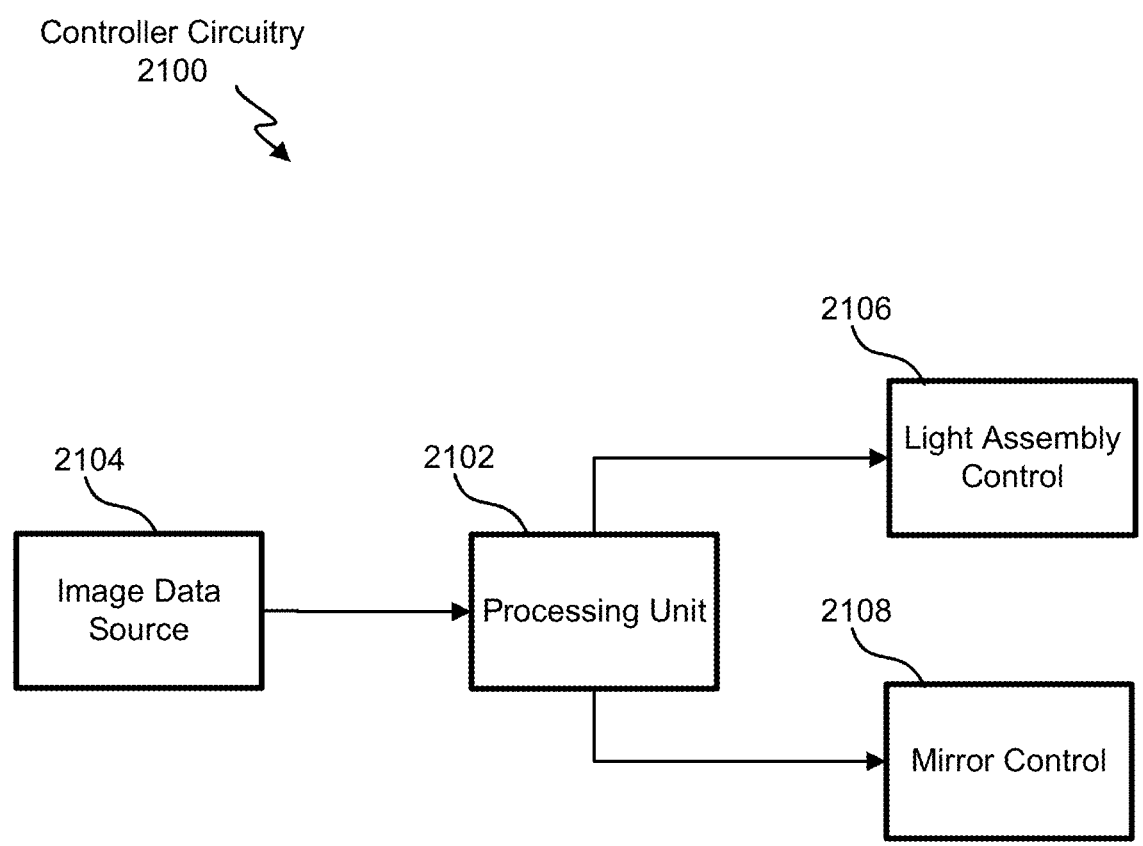
FIG. 21 is a block diagram of controller circuitry, according to an embodiment.

FIG. 21 is a block diagram of controller circuitry 2100, according to an embodiment. The controller circuitry 2100 can be used, for example, to control the operation of a light assembly and mirror (e.g., the light assembly 600 and mirror 704 of FIG. 7) to provide an output light pattern, according to embodiments. As such, the controller circuitry 2100 may be incorporated into and/or used with a mirror scanning system (e.g. mirror scanning system 700 of FIG. 7) and/or incorporated into a larger controller of a near-eye display (e.g., controller 330 of FIG. 3). The embodiment illustrated in FIG. 21 comprises processing unit 2102, image data sourced 2104, light assembly control 2106, and mirror control 2108. However, as with other figures provided herein, alternative embodiments may vary from the embodiment illustrated in FIG. 21. Alternative embodiments can, for example, combine, separate, rearrange, and/or otherwise vary the components illustrated in FIG. 21.

The controller circuitry 2100 can operate to synchronize the rotation of the mirror and the emission of light by the light assembly to ensure the output image pattern is correctly illuminated. To do so, the processing unit 2102 may obtain data from the image data source 2104 to produce the output light pattern. The processing unit 2102 may comprise, for example, one or more general-purpose processors, one or more special-purpose processors (such as digital signal processing (DSP) integrated circuits, microprocessors, application specific integrated circuits (ASICs), and/or the like) and/or other processing structure or means. The image data 2104 may comprise, for example, a memory (e.g., local and/or remotely accessible storage, a solid-state storage device, such as a random access memory ("RAM"), and/or a read-only memory ("ROM"), which can be programmable, flash-updateable, and/or the like), data stream, and/or other source.

The light assembly control 2106 may comprise circuitry configured to cause light sources of the light assembly to emit light (e.g., as described above with regard to FIGS. 8 and 9), and may control timing and/or other aspects (e.g., intensity, duty cycle, etc.) of the emission of light by light sources. The mirror control 2108 may similarly control aspects of how the mirror rotates (e.g., speed of a scan/rotation, etc.). The processing unit 2102 may therefore use the data obtained from the image data source 2104 to provide control signals to both the light assembly control 2106 and the mirror control 2108 to synchronize the emission of light by the light assembly and the rotation of the mirror to form an output light pattern in the manner of the embodiments described above. Because a light assembly may illuminate different portions of an output light pattern at different times during the scanning period, the processing unit 2102 may process the data received from the image data source 2104 to ensure the light assembly is correctly illuminated at each of these times during the scanning period.

Figure 22:
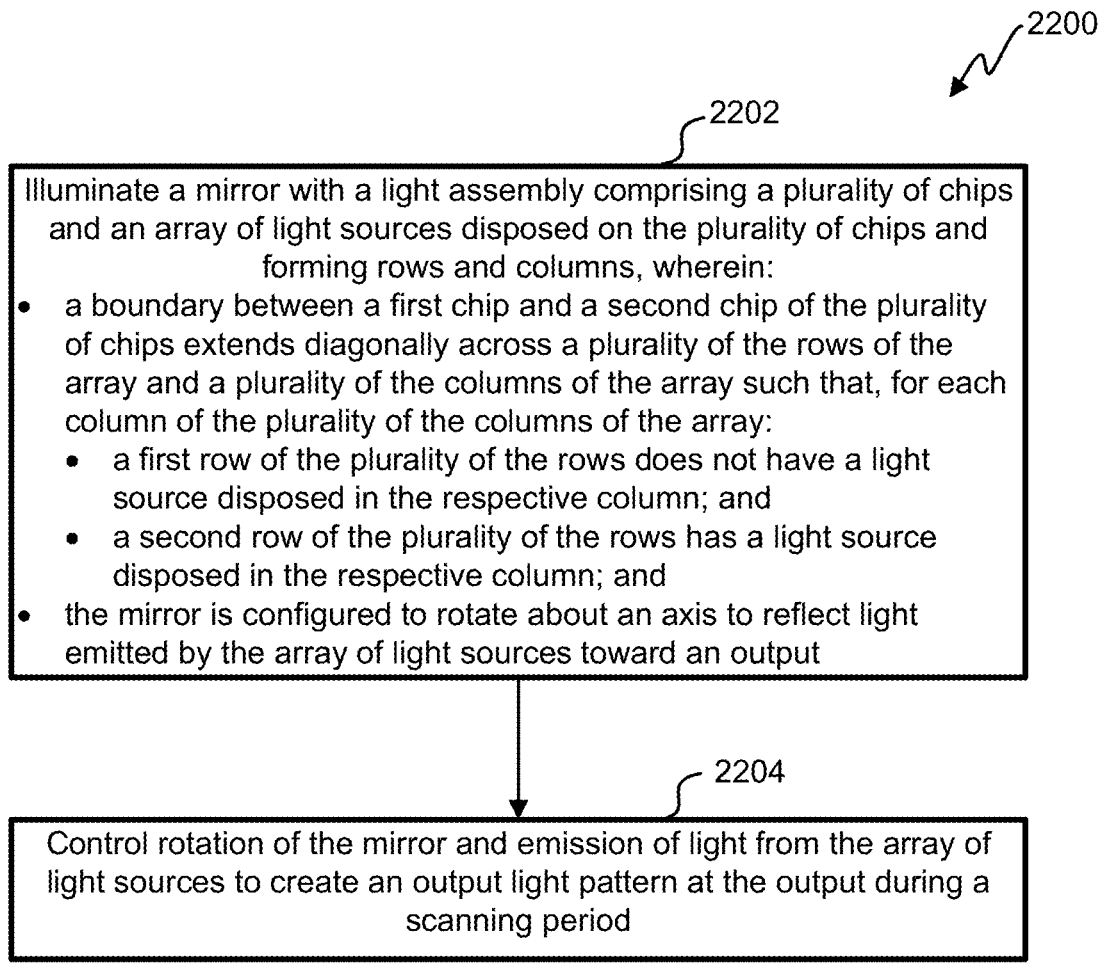
FIG. 22 is a flow diagram of a method of providing uniform and illumination of scan lines in an output light pattern of a scanning architecture, according to an embodiment.

FIG. 22 is a flow diagram of a method 2200 of providing uniform illumination of scan lines in an output light pattern of a scanning architecture, according to an embodiment. Means for performing one or more of the functions described in the blocks of FIG. 22 may comprise hardware and/or software components, such as the controller circuitry 2100 of FIG. 21. A person of ordinary skill in the art will recognize that alternative embodiments may alter the functionality illustrated in the blocks of FIG. 22 to combine, separate, and/or otherwise rearrange the illustrated functionality.

At block 2202, the functionality comprises illuminating a mirror with a light assembly comprising a plurality of chips and an array of light sources disposed on the plurality of chips and forming rows and columns. As discussed in the embodiments above, inter-chip blank regions may exist between chips. And thus, a boundary between a first chip and a second chip of the plurality of chips may extend diagonally across a plurality of the rows of the array and a plurality of the columns of the array such that, for each column of the plurality of columns of the array, a first row of the plurality of the rows does not have a light source disposed in the respective column and a second row of the plurality of the rows has a light source disposed in the respective column. Additionally, the mirror may be configured to rotate about an axis to reflect light emitted by the array of light sources toward an output. As noted in the embodiments herein, an on-chip blank region may comprise a region on a single chip in which no light sources used during the scanning period are disposed. In some embodiments, each chip of the plurality of chips may comprise one or more on-chip blank regions. In some embodiments, the on-chip blank regions may correspond with locations on a chip at which an electrode for two or more light sources of the plurality of light sources is disposed. In some embodiments, each chip of the plurality of chips may be substantially non-rectangular, parallelogram shaped, forming a non-rectangular parallelogram in which pairs of parallel edges are nonorthogonal.

At block 2204, the functionality comprises controlling rotation of the mirror and emission of light from the array of light sources to create an output light pattern at the output during a scanning period. As previously described, for example, an inter-chip blank region may reduce an amount of light sources in a column of the light assembly. Additionally, the one or more on-chip blank regions limit the number of lights available for illuminating each scan line for other ones of the plurality of scan lines such that the number of light sources available for illuminating each scan line is uniform for all scan lines of the plurality of scan lines. That is, each scan line in an output light pattern has the same number of light sources available to illuminate the scan line.

As previously described, alternative embodiments may include one or more additional features. In some embodiments, the rows of the array of light sources may comprise two or more subsets of rows that are offset such that a first plurality of light sources in a first subset of rows forms a first subset of columns of the columns of the array of light sources, and a second plurality of light sources in a second subset of rows forms a second subset of columns of the columns of the array of light sources, where the second subset of columns is offset from the first subset of columns. As indicated above, this can provide for super resolution in the output light pattern. As illustrated in FIGS. 11 and 12, staggering rows to form different columns can be done in a variety of ways. In one embodiment, for example, the first subset of rows comprises even rows in the rows of the array of light sources, and the second subset of rows comprises odd rows in the rows of the array of light sources. In another embodiment, the first subset of rows comprises a first group of adjacent rows in the rows of the array of light sources, and at the second subset of rows comprises a second group of adjacent rows in the rows of the array of light sources. Additionally or alternatively, the light assembly may further comprise a plurality of unused light sources that are not used to illuminate the output. These unused light sources may be disposed outside an active region of the light assembly (e.g., in a triangular portion at the end of a parallelogram-shaped chip). In some embodiments, the output may comprise a waveguide. As indicated in FIG. 4, for example, this waveguide may include a coupling element 350 and may be part of a larger near-eye display, such as near-eye display 100 of FIG. 1. In some embodiments, the light assembly may comprise two or more subassemblies in which a first subassembly comprises a first subset of the plurality of light sources configured to emit a first color of light, and a second subassembly comprises a second subset of the plurality of light sources configured to emit a second color of light. In some embodiments. As indicated in FIG. 20, for example, these subassemblies may be stacked within the light assembly such that columns of light sources on each subassembly align with columns of light sources on other subassemblies. Some embodiments may include three or more colors of light.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
a light assembly comprising:
a plurality of chips; and
an array of light sources disposed on the plurality of chips and forming rows and columns such that each chip of the plurality of chips comprises a respective portion of the array spanning two or more of the rows and two or more of the columns, wherein a boundary between a first chip and a second chip of the plurality of chips extends diagonally across a plurality of the rows of the array and a plurality of the columns of the array such that, for each column of the plurality of the columns of the array:
a first row of the plurality of the rows does not have a light source disposed in the respective column; and
a second row of the plurality of the rows has a light source disposed in the respective column;
a mirror configured to rotate about an axis to reflect light emitted by the array of light sources toward an output; and
controller circuitry configured to coordinate rotation of the mirror and emission of light from the array of light sources to create an output light pattern at the output during a scanning period.

2. The system of claim 1, wherein each chip of the plurality of chips comprises one or more on-chip blank regions, disposed entirely on the respective chip, in which no light sources used during the scanning period are disposed.

3. The system of claim 2, wherein:
the boundary extends diagonally across the plurality of the rows of the array and the plurality of the columns of the array at an angle and width, and
each of the one or more on-chip blank regions have substantially the same angle and substantially the same width as the boundary.

4. The system of claim 2, wherein each of the one or more on-chip blank regions corresponds to locations on a respective chip of the plurality of chips at which an electrode for two or more light sources of the array of light sources is disposed.

5. The system of claim 1, wherein the rows of the array of light sources comprise two or more subsets of rows that are offset such that a first plurality of light sources in a first subset of rows forms a first subset of columns of the columns of the array of light sources, and a second plurality of light sources in a second subset of rows forms a second subset of columns of the columns of the array of light sources, wherein the second subset of columns is offset from the first subset of columns.

6. The system of claim 5, wherein the first subset of rows comprises even rows in the rows of the array of light sources, and the second subset of rows comprises odd rows in the rows of the array of light sources.

7. The system of claim 5, wherein the first subset of rows comprises a first group of adjacent rows in the rows of the array of light sources, and the second subset of rows comprises a second group of adjacent rows in the rows of the array of light sources.

8. The system of claim 1, wherein each chip of the plurality of chips is substantially non-rectangular, parallelogram shaped.

9. The system of claim 8, wherein an angle of the boundary between the first chip and the second chip of the plurality of chips with respect to the array is such that each column of the plurality of the columns of the array has a same number of light sources available to illuminate each pixel of a respective column of pixels of the output light pattern during the scanning period as each other column of the plurality of the columns of the array.

10. A method comprising:
illuminating a mirror with a light assembly comprising a plurality of chips and an array of light sources disposed on the plurality of chips and forming rows and columns such that each chip of the plurality of chips comprises a respective portion of the array spanning two or more of the rows and two or more of the columns, wherein:
a boundary between a first chip and a second chip of the plurality of chips extends diagonally across a plurality of the rows of the array and a plurality of the columns of the array such that, for each column of the plurality of the columns of the array:
a first row of the plurality of the rows does not have a light source disposed in the respective column; and
a second row of the plurality of the rows has a light source disposed in the respective column; and
the mirror is configured to rotate about an axis to reflect light emitted by the array of light sources toward an output; and
controlling rotation of the mirror and emission of light from the array of light sources to create an output light pattern at the output during a scanning period.

11. The method of claim 10, wherein the rows of the array of light sources comprises two or more subsets of rows that are offset such that a first plurality of light sources in a first subset of rows forms a first subset of columns of the columns of the array of light sources, and a second plurality of light sources in a second subset of rows forms a second subset of columns of the columns of the array of light sources, wherein the second subset of columns is offset from the first subset of columns.

12. The method of claim 11, wherein the first subset of rows comprises even rows in the rows of the array of light sources, and the second subset of rows comprises odd rows in the rows of the array of light sources.

13. The method of claim 10, wherein each chip of the plurality of chips comprises one or more on-chip blank regions, disposed entirely on the respective chip, in which no light sources used during the scanning period are disposed.

14. The method of claim 10, wherein controlling the rotation of the mirror and the emission of light from the array of light sources further comprises controlling the rotation of the mirror and the emission of light such each pixel of a column of pixels in the output light pattern is illuminated by light sources respective rows of a corresponding column of the array of light sources during the scanning period.

15. A light assembly comprising:
an array of light sources forming rows and columns, wherein the array comprises a plurality of chips, each chip of the plurality of chips comprising a subarray of the light sources, and each subarray forming a respective portion of two or more of the rows and two or more of the columns of the array; and wherein:
a boundary between a first chip and a second chip of the plurality of chips extends diagonally across a plurality of the rows of the array and a plurality of the columns of the array such that, for each column of the plurality of the columns of the array:
- a first row of the plurality of the rows does not have a light source disposed in the respective column; and
- a second row of the plurality of the rows has a light source disposed in the respective column.

16. The light assembly of claim 15, wherein each chip of the plurality of chips comprises one or more on-chip blank regions, disposed entirely on the respective chip, in which no light sources used during a scanning period are disposed.

17. The light assembly of claim 16, wherein:
- the boundary extends diagonally across the plurality of the rows of the array and the plurality of the columns of the array at an angle and width, and
- each of the one or more on-chip blank regions have substantially the same angle and substantially the same width as the boundary.

18. The light assembly of claim 16, wherein each of the one or more on-chip blank regions corresponds to locations on a respective chip of the plurality of chips at which an electrode for two or more light sources of the array of light sources is disposed.

19. The light assembly of claim 15, wherein the rows of the array of light sources comprise two or more subsets of rows that are offset such that a first plurality of light sources in a first subset of rows forms a first subset of columns of the columns of the array of light sources, and a second plurality of light sources in a second subset of rows forms a second subset of columns of the columns of the array of light sources, wherein the second subset of columns is offset from the first subset of columns.

20. The light assembly of claim 15, wherein each chip of the plurality of chips is substantially non-rectangular, parallelogram shaped.

* * * * *